United States Patent
Guan et al.

(10) Patent No.: US 12,485,205 B2
(45) Date of Patent: Dec. 2, 2025

(54) BIODEGRADABLE ZINC-BASED MATERIALS INCLUDING DISPERSED NANOSTRUCTURES FOR BIOMEDICAL APPLICATIONS

(71) Applicant: THE REGENTS OF THE UNIVERSITY OF CALIFORNIA, Oakland, CA (US)

(72) Inventors: Zeyi Guan, Los Angeles, CA (US); Jingke Liu, Los Angeles, CA (US); Jasmine Li, Los Angeles, CA (US); Xiaochun Li, Los Angeles, CA (US); Injoo Hwang, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 860 days.

(21) Appl. No.: 17/265,163

(22) PCT Filed: Aug. 1, 2019

(86) PCT No.: PCT/US2019/044631
§ 371 (c)(1),
(2) Date: Feb. 1, 2021

(87) PCT Pub. No.: WO2020/028643
PCT Pub. Date: Feb. 6, 2020

(65) Prior Publication Data
US 2021/0353835 A1   Nov. 18, 2021

Related U.S. Application Data

(60) Provisional application No. 62/714,019, filed on Aug. 2, 2018.

(51) Int. Cl.
| | |
|---|---|
| A61L 31/12 | (2006.01) |
| B22D 18/06 | (2006.01) |
| C22C 1/10 | (2023.01) |
| C22C 32/00 | (2006.01) |

(52) U.S. Cl.
CPC ........... *A61L 31/124* (2013.01); *A61L 31/122* (2013.01); *C22C 1/1036* (2013.01); *C22C 32/0052* (2013.01); *A61L 2400/12* (2013.01); *B22D 18/06* (2013.01); *C22C 1/1047* (2023.01)

(58) Field of Classification Search
None
See application file for complete search history.

(56) References Cited

U.S. PATENT DOCUMENTS

| | | | |
|---|---|---|---|
| 3,774,668 A | 11/1973 | Sulzer | |
| 5,603,722 A * | 2/1997 | Phan | A61L 31/04 606/198 |
| 2006/0229711 A1* | 10/2006 | Yan | A61F 2/82 623/1.38 |
| 2009/0088834 A1* | 4/2009 | Wang | A61L 31/124 623/1.15 |
| 2011/0201984 A1 | 8/2011 | Dubrow et al. | |
| 2011/0238155 A1* | 9/2011 | Wang | A61L 31/124 623/1.38 |
| 2015/0111065 A1* | 4/2015 | Konyashin | C23C 4/129 148/333 |
| 2019/0105876 A1* | 4/2019 | Al-Aqeeli | B33Y 70/00 |

FOREIGN PATENT DOCUMENTS

| | | | |
|---|---|---|---|
| DE | 10301174 B4 | | 1/2006 |
| JP | H09505231 | * | 5/1997 |
| WO | WO-2017/173163 A1 | | 10/2017 |

OTHER PUBLICATIONS

Kannan et al. (Biocompatibility and biodegradation studies of a commercial zinc allow for temporary mini-implant applications, Scientific reports, Nov. 15, 2017). (Year: 2017).*
International Search Report and Written Opinion issued in PCT Application No. PCT/US2019/044631 dtd Oct. 21, 2019, 11 pages.

* cited by examiner

*Primary Examiner* — Melissa S Mercier
(74) *Attorney, Agent, or Firm* — Foley & Lardner LLP

(57) ABSTRACT

A biomedical device includes a zinc-based material including a matrix including zinc, and nanostructures dispersed in the matrix. Embodiments of this disclosure are directed to zinc (Zn)-based materials including dispersed nanostructures for biomedical applications and devices, such as bioresorbable vascular stents, bioresorbable ureteral stents, endoluminal springs for distraction enterogenesis, biodegradable bone implants with tunable modulus, guided bone generation membranes, bioresorbable dental membranes, and other biomedical implants, as well as other functional applications, such as biodegradable electronics and sensors.

7 Claims, 20 Drawing Sheets

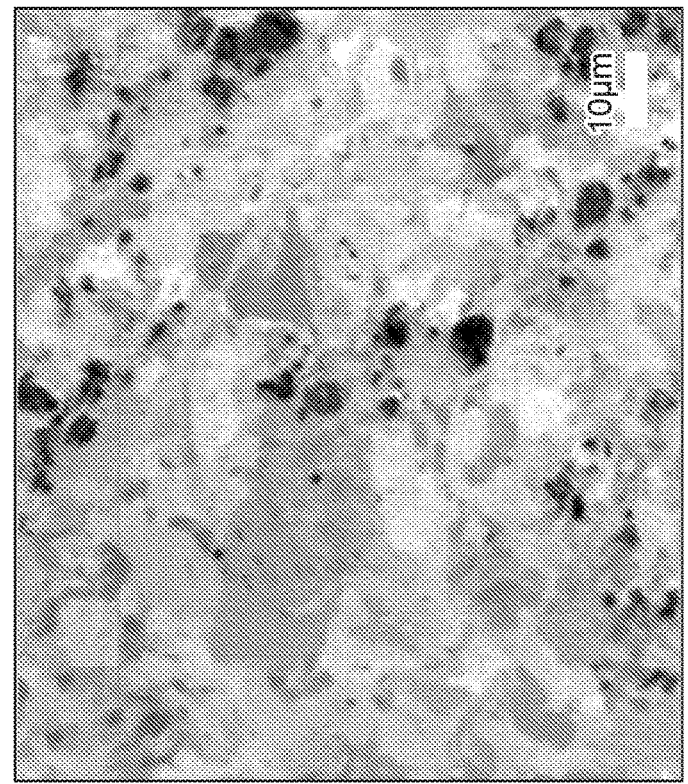
FIG. 2G
| Element Lin | Net Counts | Element Wt.% |
|---|---|---|
| O K | 11841 | 2.2 |
| Zn L | 506934 | 77.6 |
| W M | 84362 | 20.2 |
| Total | | 100 |
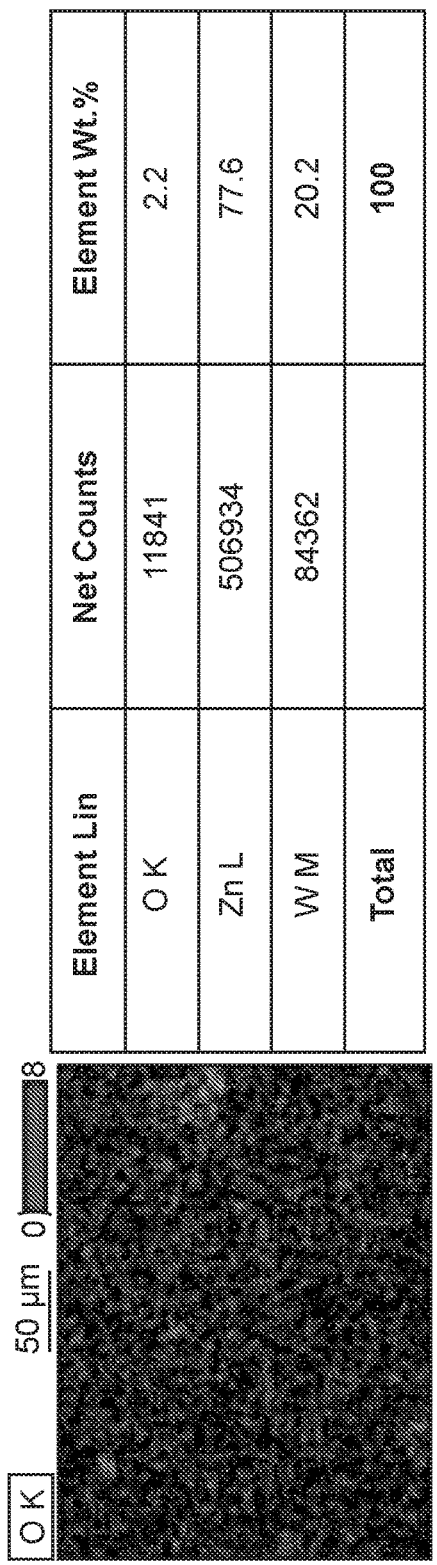
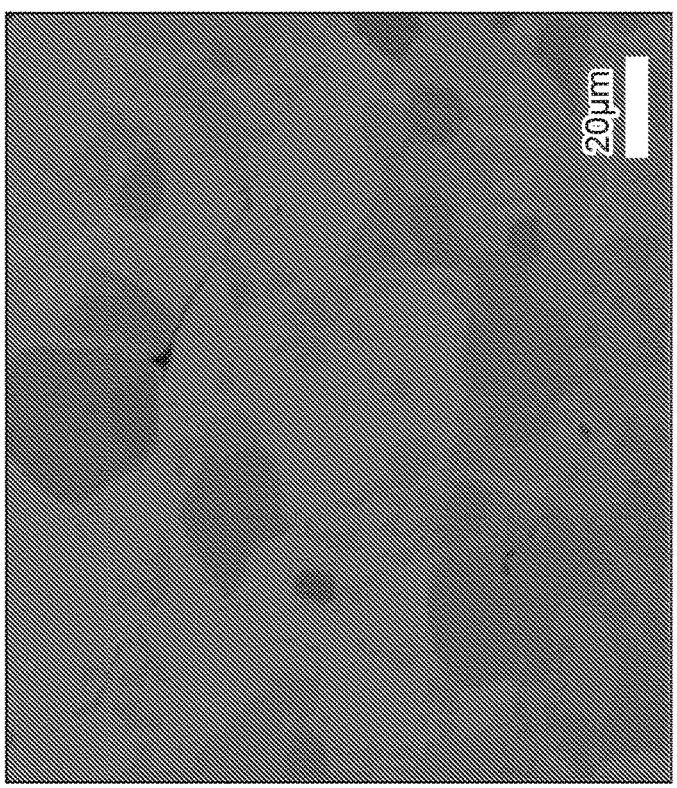
FIG. 2I
FIG. 2H Table 2 Yield strength and ultimate tensile strength of pure Zn and Zn-10WC nanocomposite

| Samples | PureZn | | Zn-10WC | |
|---|---|---|---|---|
| | Yield strength (MPa) | Ultimate compressive strength (MPa) | Yield strength (MPa) | Ultimate compressive strength (MPa) |
| 1 | 21 | 56 | 136 | 547 |
| 2 | 24 | 50 | 102 | 480 |
| 3 | 22 | 51 | 118 | 601 |
| 4 | 23 | 45 | 117 | 406 |
| 5 | 27 | 53 | 109 | 502 |
| Average | 23.4 | 51.0 | 116.4 | 507.2 |
| Standard deviation | 2.1 | 3.6 | 11.4 | 65.4 |

FIG. 3D

Table 3 Yield and ultimate tensile strength of the pure Zn and Zn-10WC nanocomposites microwires

| Samples | Pure Zn | | Zn-10WC | |
|---|---|---|---|---|
| | Yield strength (MPa) | Ultimate tensile strength (MPa) | Yield strength (MPa) | Ultimate tensile strength (MPa) |
| 1 | 18 | 37 | 57 | 108 |
| 2 | 11 | 21 | 46 | 82 |
| 3 | 17 | 35 | 59 | 110 |
| 4 | 9 | 17 | 57 | 107 |
| 5 | 12 | 26 | 55 | 103 |
| Average | 13.4 | 27.2 | 54.8 | 102 |
| Standard deviation | 3.5 | 7.8 | 4.6 | 10.3 |

FIG. 4G

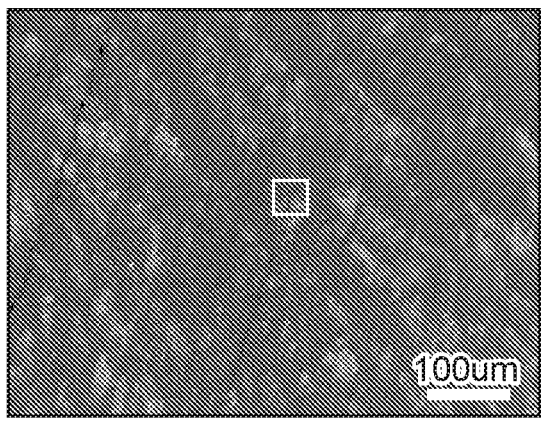
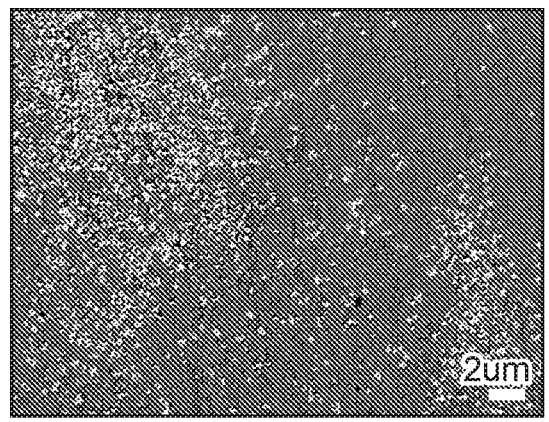
FIG. 12A  FIG. 12B
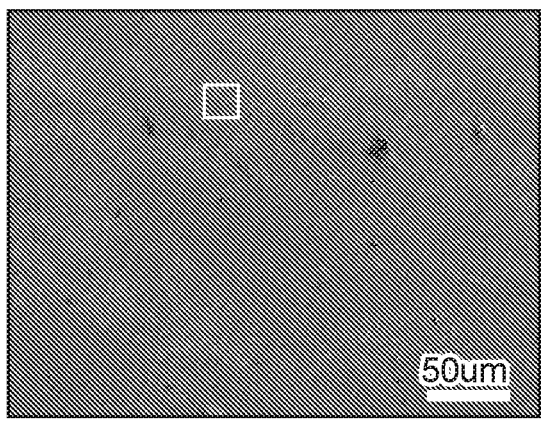
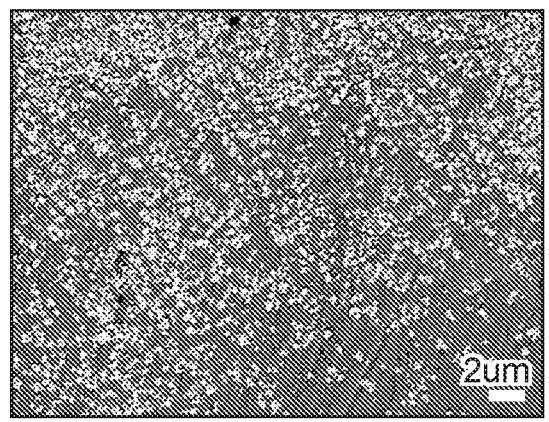
FIG. 12C  FIG. 12D

BIODEGRADABLE ZINC-BASED MATERIALS INCLUDING DISPERSED NANOSTRUCTURES FOR BIOMEDICAL APPLICATIONS

CROSS-REFERENCE TO RELATED APPLICATIONS

This application is a national stage entry under 35 U.S.C. § 371 of International Application No. PCT/US2019/044631, filed Aug. 1, 2019, which claims the benefit of U.S. Provisional Application No. 62/714,019, filed Aug. 2, 2018, the contents of which are incorporated herein by reference in their entirety.

STATEMENT REGARDING FEDERALLY SPONSORED RESEARCH OR DEVELOPMENT

This invention was made with government support under Grant Number 1449395, awarded by the National Science Foundation. The government has certain rights in the invention.

TECHNICAL FIELD

This disclosure generally relates to biodegradable zinc-based materials for biomedical applications.

BACKGROUND

The good biocompatibility and biodegradability of zinc (Zn) renders it desirable for applications in the biomedical field, such as orthopedic implants and other biomedical implants. The desirable degradation rate of Zn in the human body makes it a good candidate for biodegradable, temporary implants. However, Zn suffers from low mechanical performance, thus impeding its use for load-bearing medical structures.

It is against this background that a need arose to develop the embodiments described herein.

SUMMARY

In some embodiments, a biomedical device includes a Zn-based material including a matrix including Zn, and nano structures dispersed in the matrix.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 12. Zn—WC nanocomposite microstructure from SEM in back scattering mode. (a) and (c) represent Zn-2.6 vol. % WC (Zn-2.6WC) sample and Zn-4.4 vol. % WC (Zn-4.4WC) sample, while (b) and (d) are the magnified images.

DETAILED DESCRIPTION

Figure 1:
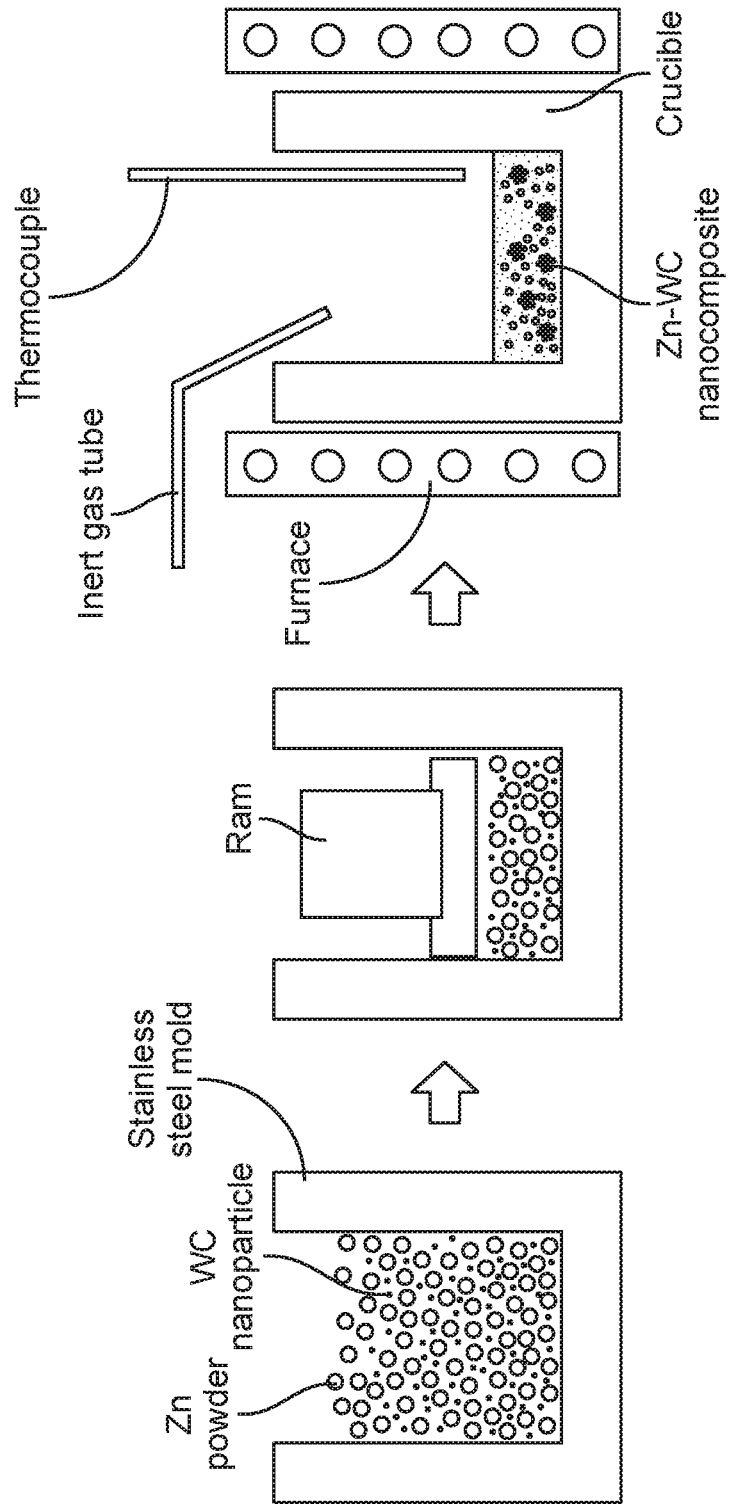
FIG. 1. Schematic of experimental method.

Embodiments of this disclosure are directed to zinc (Zn)-based materials including dispersed nanostructures for biomedical applications and devices, such as bioresorbable vascular stents, bioresorbable ureteral stents, endoluminal springs for distraction enterogenesis, biodegradable bone implants with tunable modulus, guided bone generation membranes, bioresorbable dental membranes, and other biomedical implants, as well as other functional applications, such as biodegradable electronics and sensors.

In some embodiments, a Zn-based material can be a metal matrix nanocomposite (MMNC) including a matrix of one or more metals and nanostructures dispersed in the matrix. Examples of suitable matrix materials include Zn and zinc alloys, such as zinc-magnesium (Zn—Mg) alloy, zinc-iron (Zn—Fe) alloy, and other alloys of zinc (as a primary component by weight) and one or more additional metals such as aluminum (Al), silver (Ag), copper (Cu), manganese (Mn), nickel (Ni), titanium (Ti), chromium (Cr), and cobalt (Co). In some embodiments, the nanostructures can have at least one dimension in a range of about 1 nm to about 1000 nm, such as about 1 nm to about 500 nm, about 1 nm to about 400 nm, about 1 nm to about 300 nm, about 1 nm to about 200 nm, or about 1 nm to about 100 nm. In some embodiments, the nanostructures can have at least one dimension in a range of about 100 nm to about 1000 nm; in other embodiments, the nanostructures can have at least one dimension below about 100 nm and down to about 1 nm. In some embodiments, the nanostructures can have at least one average or median dimension in a range of about 1 nm to about 500 nm, about 1 nm to about 400 nm, about 1 nm to about 300 nm, about 1 nm to about 200 nm, or about 1 nm to about 100 nm. In some embodiments, the nanostructures can have at least one average or median dimension in a range of about 100 nm to about 1000 nm; in other embodiments, the nanostructures can have at least one average or median dimension below about 100 nm and down to about 1 nm. In some embodiments, the nanostructures can include nanoparticles having an aspect ratio of about 5 or less or about 3 or less or about 2 or less and having generally spherical or spheroidal shapes, although other shapes and configurations of nanostructures are contemplated, such as nanofibers and nanoplatelets. In some embodiments, the nanostructures can be included in the Zn-based material at a volume fraction of about 2.5% or greater, such as about 3% or greater, about 4% or greater, about 5% or greater, about 6% or greater, about 7.5% or greater, about 10% or greater, or about 12.5% or greater, and up to about 15% or greater. In other embodiments, the nanostructures can be included in the Zn-based material at a volume fraction of about 2.5% or less, such as down to about 1% or less.

In some embodiments, the nanostructures can include one or more ceramics, although other nanostructure materials are contemplated, including metals or other conductive materials, as well as materials to impart anti-fungal or anti-bacterial properties. Examples of suitable nanostructure materials include metal oxides (e.g., alkaline earth metal oxides, such as magnesium oxide (MgO), post-transition metal oxides, such as aluminum oxide ($Al_2O_3$), and transition metal oxides, such as titanium oxide ($TiO_2$) and zirconium oxide ($ZrO_2$)), non-metal oxides (e.g., silicon oxide ($SiO_2$)), metal carbides (e.g., transition metal carbides, such as titanium carbide (TiC), niobium carbide (NbC), chromium carbide ($Cr_3C_2$), nickel carbide (NiC), hafnium carbide (HfC), vanadium carbide (VC), tungsten carbide (WC), and zirconium carbide (ZrC)), non-metal carbides (e.g., silicon carbide (SiC) and boron carbide ($B_4C$)), metal silicides (e.g., transition metal silicides, such as titanium silicide (TiSi)), metal borides (e.g., transition metal borides, such as titanium boride ($TiB_2$), zirconium boride ($ZrB_2$), chromium monoboride (CrB), chromium diboride ($CrB_2$), hafnium boride ($HfB_2$), vanadium boride ($VB_2$), and tungsten boride ($W_2B_5$, $WB_2$, and so forth)), metal nitrides (e.g., post-transition metal nitrides, such as aluminum nitride ($AlN_3$), and transition metal nitrides), non-metal nitrides (e.g. boron nitride (BN)), metals (e.g., transition metals in elemental form such as tungsten (W)), alloys, mixtures, or other combinations of two or more of the foregoing. Particular examples of suitable nano structure materials include transition metal-containing ceramics, such as transition metal carbides (e.g., WC and TiC) and transition metal borides (e.g., $ZrB_2$, $TiB_2$ and $CrB_2$), non-metal carbides (e.g., SiC), as well as post-transition metal oxides (e.g., $Al_2O_3$).

In some embodiments, Zn-based materials including dispersed nanostructures can provide advantages including one or more of the following:

(1) Strengthening: well-dispersed nanostructures can efficiently strengthen a matrix through Orowan strengthening and grain refinement. Orowan strengthening refers to the strengthening effect by which nanostructures impede a dislocation movement.

(2) Grain refinement: during the solidification of molten zinc, nanostructures can affect the nucleation and restrict the growth of grains. The reduction of grain size leads to the grain-boundary strengthening effect (Hall-Petch effect), which can further enhance material performance. In some embodiments, a matrix including Zn (and in which nanostructures are dispersed) can be polycrystalline and include grains having an average grain size of up to about 12 μm, up to about 10 μm, up to about 8 μm, or up to about 6 μm, and down to about 4 μm or less.

(3) Modification of the modulus: the high modulus (elastic modulus and shear modulus) of hard nanostructures can significantly enhance the modulus of a matrix including Zn. The tunable modulus can be desirable, for example, in the application of a bone implant, which specifies a fixture material to match the modulus of a local bone material.

(4) Improvement of creep and fatigue resistance: nanostructures can increase the creep resistance and enhance the fatigue life of a matrix including Zn by reducing the effective stress on the matrix.

(5) Hardness enhancement: the high hardness of nanostructures can enhance the hardness of a Zn-based material, and consequently render it better able to withstand different environments, especially as biocompatible/bioresorbable electronics.

(6) Inhibition of the natural aging and retaining ductility: the plastically deformed Zn alloys (e.g., Zn—Mg alloy) often suffers natural aging and ductility loss at room and physiological temperatures or above. Nanostructures can sufficiently inhibit the natural aging effect of Zn alloy and control the precipitate formation by impeding the migration of an alloying element in Zn. For example, a comparative hot-worked Zn—Mg alloy can barely retain the ductility due to the formation of $Mg_2Zn_{11}$ intermetallic phase, which mostly forms on grain boundaries. With the presence of nanostructures, such intermetallic phase no long forms (to a detectable extent) in networks but remains granular and separated. This phenomenon ultimately allows Zn alloys to retain their good ductility.

(7) Reduce the size of intermetallic phase of Zn alloys: dispersed nanostructures can inhibit the intermetallic phase growth during a solidification process and control the grain growth simultaneously. The grain size reduction ultimately enhances the malleability and ductility of Zn alloys.

(8) Retaining the excellent biocompatibility and moderate corrosion rate of Zn: due to the highly reactively stable and thermally stable properties of nanostructures, Zn-based materials including nanostructures do not suffer from the loss of biocompatibility and increasing of bio-corrosion rate.

(9) Allowing flexible and versatile manufacturing, such as casting, 3D printing, forming, extrusion, rolling, drawing, machining, and so forth, due to the grain size refinement and modification of microstructures by dispersed nanostructures.

In some embodiments, applications of Zn-based materials including dispersed nanostructures can include the following:

(1) Bioresorbable stent: A Zn-based material can be included in a biodegradable, temporary implant, such as a stent for placement inside a blood vessel, canal, or duct to aid healing or relieve an obstruction. Mechanical properties of pure Zn are insufficient to be a load-bearing material for implant applications; nevertheless it has a desirable biodegradation rate for stents. Zn demonstrates steady biodegradation rates with no severe inflammation, local toxicity, platelet aggregation, thrombosis or intimal hyperplasia. Incorporation of nanostructures can enhance mechanical properties of Zn, without measurably affecting the biodegradation rate and biocompatibility of Zn. Also, a Zn-based material can maintain mechanical integrity for 6 months or more and has greater elongation to failure than Mg and Fe (e.g., having a ductility of about 30% or greater, about 40% or greater, about 50% or greater, about 60% or greater, or about 70% or greater, and up to about 80% or greater). In contrast, slow degradation rate of Fe-based stents can lead to long-term side effects such as inflammatory response, while rapid degradation rate of Mg-based stents can give rise to a loss of mechanical integrity in a short time period, and Mg-based stents can often induce rapid hydrogen evolution beyond the capability that a human body can release. Moreover, Mg-based stents can result in alkaline pH and increased Mg ion concentration, potentially causing complications. Also, since Fe and Mg are radiolucent materials, markers formed of precious metals such as gold, platinum and tantalum are embedded in stents formed of Fe or Mg for fluoroscopic visibility. However, radiopaque property of Zn can allow omission of such markers for X-ray visibility. Further, anti-corrosion property of Zn imparts corrosion resistance to implants.

Figure 15:
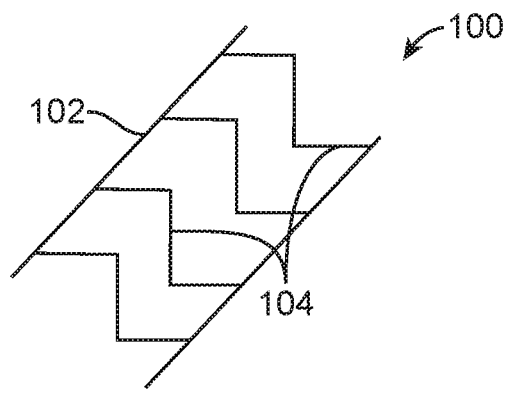
FIG. 15. Schematic of a stent according to some embodiments.

Bioresorbable stents including a Zn-based material can include vascular stents and ureteral stents, which facilitate the flow of urine from a kidney to a bladder for treatment of post-operative blockage, towards preventing infection, encrustation, complication and discomfort from patients. FIG. 15 is a schematic of a stent 100 according to some embodiments. As shown, the stent 100 includes a generally tubular body 102 including a set of one or more wires 104 woven into a network. The wires 104 include a Zn-based material including nanostructures dispersed therein.

(2) Bioresorbable mechanical extension (spring) implant: An endoluminal spring (for distraction enterogenesis) usually specifies an appropriate spring constant (e.g., about 10 N/m or greater) with adequate absorption rate. The spring is placed inside a small intestine to functionally expand and apply a substantially constant force uniformly along the small intestine. Comparative bioresorbable polymeric springs can satisfy this criterion, but due to the innate low strength and shear modulus, thick springs are implemented to provide such spring constant. One of the side effects of such thick polymeric spring is that it can partially block the small intestine. Furthermore, a constituent polymer also can suffer from a rapid loss of integrity during absorption.

Figure 16:
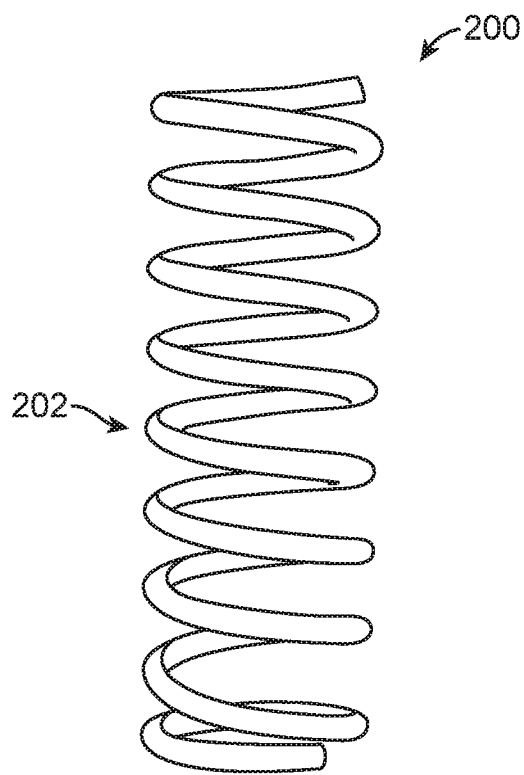
FIG. 16. Schematic of an endoluminal spring according to some embodiments.

Advantageously, a Zn-based material with dispersed nanostructures can obtain a large modulus, since Zn (as a metal) has a much larger modulus than polymers. Also, Zn-based materials with dispersed nanostructures can be tuned to a wide range of modulus by adjusting a concentration and a size of the nanostructures. A high shear modulus Zn-based material can allow springs formed from thin wires to function similarly as thick polymeric springs, which can ultimately allow regular flow of chime. Moreover, Zn-based materials with dispersed nanostructures can be tuned to a wide range of biodegradation rates, depending on alloying concentration of a Zn alloy, from about 10 μm/year to more than about 100 μm/year. FIG. 16 is a schematic of an endoluminal spring 200 according to some embodiments. As shown, the spring 200 includes a helically shaped coil 202. The coil 202 include a Zn-based material including nanostructures dispersed therein.

(3) Bioresorbable Zn-based materials: Other strengthening strategies for bioresorbable Zn-based materials are mainly based on alloying. Alloying methods can be used to improve mechanical strength, through a combined effect from precipitation hardening of intermetallic phases, solid solution hardening, and grain boundary strengthening. However, there are significant constraints to resulting Zn alloys. Some resulting Zn alloys include elements that are not biocompatible at high concentrations, such as lithium (Li), Al, Ag, and Cu. Additionally, alloying can cause a significant reduction in the ductility of Zn as well as higher biodegradation rates due to the formation of intermetallic phases.

Advantageously, a Zn-based material, as a nanostructure-reinforced metal, can provide significantly enhanced mechanical, thermo-physical, and electrical properties. Thermally stable and reactively stable nanostructures generally have little or no reaction inside a human body, thus retaining the biocompatibility of Zn. Also, without addition of an intermetallic phase, biodegradation rate retains at the same, or similar, level of Zn. Moreover, nanostructures can strengthen a Zn-containing matrix through Orowan strengthening and grain refinement.

(4) Biodegradable bone implants with tunable modulus: Biodegradable bone implants are designed to degrade progressively in a human body to assist a healing process. Comparative bone implants include Mg and its alloys due to their biocompatibility, biodegradability, and high strength. However, the rapid biodegradation rate and release of Mg ion resulting in alkaline pH can result in various complications.

Advantageously, Zn-based materials with dispersed nanostructures can be tuned to a wide range of modulus by adjusting a concentration and a size of the nanostructures. Such Zn-based materials provide a solution to different conditions of bone implant applications (by matching to the modulus of surrounding bone tissue), while maintaining biocompatibility and biodegradability of Zn. Also, Zn demonstrates steady biodegradation rates with no severe inflammation, local toxicity, platelet aggregation, thrombosis or intimal hyperplasia. Also, a Zn-based material can maintain mechanical integrity for 6 months or more and has greater elongation to failure than Mg and Fe. Moreover, radiopaque property of Zn can allow omission of previous metal markers for X-ray visibility.

Figure 17:
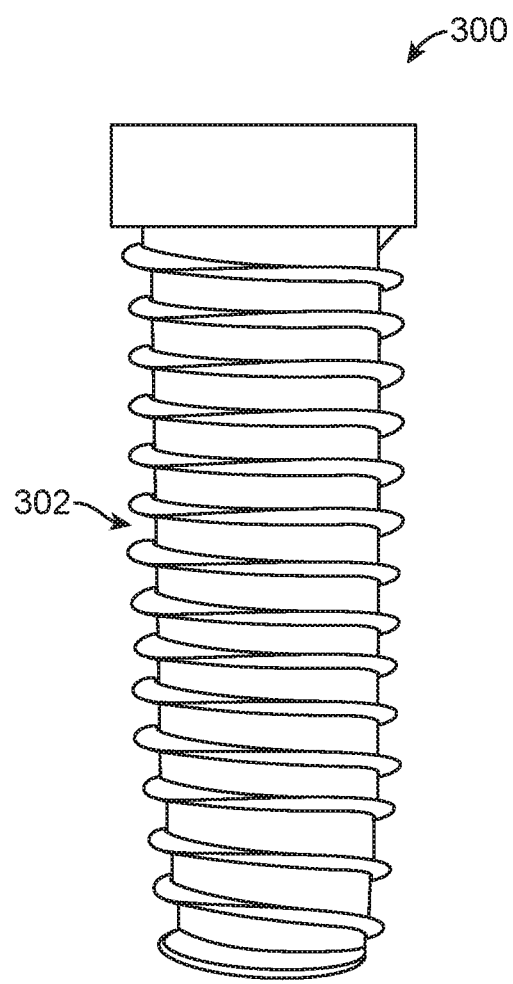
FIG. 17. Schematic of a bone implant according to some embodiments.

Biodegradable bone implants including a Zn-based material can include dental implants (e.g., bioresorbable dental screws for artificial teeth and bioresorbable dental membranes) and orthopedic implants. FIG. 17 is a schematic of a bone implant 300 according to some embodiments. As shown, the bone implant 300 is configured as a dental screw and includes an implant body 302. The implant body 302 include a Zn-based material including nanostructures dispersed therein.

(5) Bioresorbable electronics: Bioresorbable electronics encompass an electronic implant that ultimately degrades after a time period in a human body, which can avoid bacteria accumulation and infection. It specifies biodegradability, biocompatibility, electrical conductivity, stiffness, toughness, reasonable strength, and flexibility. Such electronic devices can be used in brain, nerves, muscles, and vesicles to monitor current flow, pressure, and temperature signals. Polymeric and semiconductor electronic devices can obtain good biocompatibility, but innately lack adequate electrical conductivity for a high signal to noise ratio specified by biosensors.

Advantageously, Zn-based materials with dispersed nanostructures can provide a high electrical conductivity, much higher than comparative semiconductors and polymers. Also, a Zn-based material can have a higher hardness than pure Zn, due to the presence of dispersed nanostructures. This enhanced hardness can mitigate against undesired deformation while an electronic device incorporating such material is to remain functional and maintain a substantially constant electrical resistivity. With the presence of nanostructures, a Zn-based material can have a high toughness, allowing a Zn-based electronic device to maintain its integrity before it degrades.

In some embodiments, a manufacturing method of a Zn-based material is performed by salt-assisted stir casting, followed by hot rolling or another shaping procedure. In some embodiments, the manufacturing method includes: (1) heating a matrix material including Zn to form a melt; (2) loading a mixture including a salt (e.g., a fluoride salt such as potassium aluminum fluoride ($KAlF_4$)) and nanostructures over a surface of the melt, such that the salt is heated to form a molten salt including the nanostructures dispersed therein; (3) agitating the melt to incorporate the nanostructures from the molten salt into the melt; and (4) cooling the melt including the nanostructures dispersed therein to form a preform. The preform then can be subjected to hot rolling or another shaping procedure into a desired shape.

In other embodiments, an improved, cost-effect method is developed to manufacture a Zn-based material by cold compaction, followed by casting or another shaping procedure. Ultrasonic processing and mechanical stirring are performed to improved dispersion of nanostructures in a metal matrix. In addition, for some embodiments, vacuum-assisted casting is performed to form Zn-based materials as hollow structures, such as tubes for stents (e.g., ureteral stents). In addition to Zn, vacuum-assisted casting can be applied to various metals and various nanostructures. Furthermore, dimensions of small hollow structures can be varied with processing parameters such as a temperature of a metal, a cooling rate, and an environmental pressure. In some embodiments, the manufacturing method includes the following fabrication stages:

(1) Zinc-Based Preform Fabrication:

In some embodiments, a powder mixture is formed by combining a metal (such as Zn in a powder or particulate form, such as in the form of microstructures) and a ceramic (such as tungsten carbide (WC) in a powder or particulate form, such as in the form of nanostructures), followed by mixing, such as by a mechanical shaker or other manner of agitation. Nano structures including the ceramic can be introduced into the well-blended powder mixture at a relatively high volume fraction of about 2.5% or greater, such as about 5% or greater, about 7.5% or greater, about 10% or greater, or about 12.5% or greater, and up to about 15% or greater. The well-blended powder mixture is then subjected to cold compaction to form a pellet, such as by placing the powder mixture in a mold and compacting the powder mixture with a hydraulic press at about room temperature (e.g., about 20° C. to about 25° C.). The pellet is then heated to a temperature at or above a melting temperature of Zn to form a melt under a protection gas of argon (Ar) or another inert gas. Agitation by ultrasonic processing and, in particular, ultrasonic cavitation-assisted processing can be performed on the melt during heating to reduce porosity and promote uniform dispersion of the nano structures. A resulting Zn-based preform is obtained by cooling under a protection gas of Ar or another inert gas.

Figure 18:
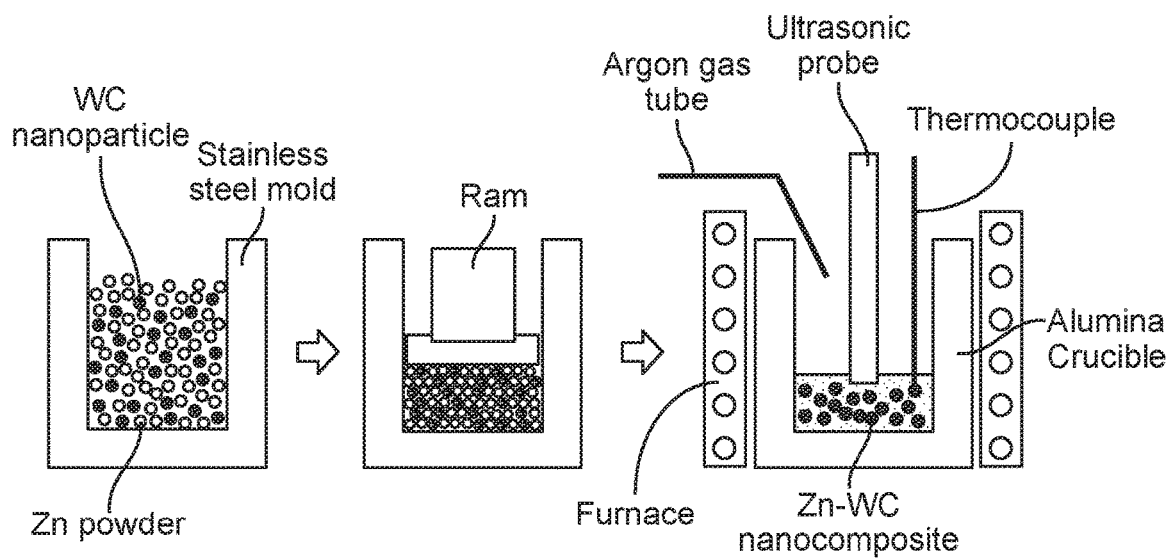
FIG. 18. Fabrication of Zn—WC nanocomposite.

As a specific example, a Zn—WC nanocomposite preform is fabricated by cold compaction followed by melting as shown in FIG. 18. About 90% volume fraction of Zn microparticles (about 150 μm, Goodfellow) and about 10% volume fraction of WC nanoparticles (about 150 nm, US Research Nanomaterials, Inc.) are weighted and mixed. The powder mixture is blended by a mechanical shaker (SK-O330-Pro) at about 300 revolution per minute (RPM) for about 30 minutes. The well-blended Zn—WC powder mixture is placed into a cylindrical stainless steel mold (inner diameter: about 38.1 mm) for cold compaction into a pellet using a hydraulic press under about 85 kN at room temperature. The Zn—WC pellet is melted in an alumina crucible at a temperature of about 450° C. by an electrical resistance furnace under a protection gas of Ar for about 30 minutes. Ultrasonic cavitation-assisted processing is performed for about 15 minutes to reduce porosity and promote nanoparticle dispersion in the nanocomposite. The final product is obtained by cooling under Ar gas protection.

Advantages of fabrication of MMNCs by cold compaction and melting include:

(a) Oxidation of a metal and nanostructure incorporation and dispersion are challenges in a liquid state fabrication of nanocomposites. Cold compaction of a powder mixture in which a metal powder and ceramic nanostructures are pre-mixed, such as by a shaker, can improve nanostructure dispersion in a metal matrix. Highly compacted mixture of the metal powder and ceramic nanostructures brings about lower oxidation of the metal in a melting process.

(b) Ultrasonic cavitation-assisted processing improves dispersion of nanostructures in a metal matrix.

(c) Cold compaction can incorporate a high-volume fraction of nanostructures into a metal matrix. In some embodiments, a nanocomposite can include nanostructures at a relatively high-volume fraction of about 2.5% or greater, such as about 5% or greater, about 7.5% or greater, about 10% or greater, or about 12.5% or greater, and up to about 15% or greater.

(d) Cold compaction followed by ultrasonic processing can be applied to various metals and various nanostructures.

(2) Zinc-Based Hollow Structure Fabrication:

In some embodiments, a resulting Zn-based preform from stage (1) is subjected to vacuum-assisted casting to form a hollow structure, such as in the form of a tube. In particular, the preform is heated to a temperature at or above a melting temperature of Zn to form a melt under a protection gas of argon or another inert gas. Then, a hollow mold, such as in the form of a glass tube, has one end placed into the melt of the molten Zn-based material, and another end connected to a vacuum pump. Through operation of the vacuum pump, a negative pressure is applied, drawing the melt into the hollow mold, followed by solidification on an inner surface of the hollow mold to form a Zn-based hollow structure within the hollow mold. An outer lateral dimension (e.g., outer diameter) of the resulting Zn-based MMNC hollow structure can be varied according to an inner lateral dimension (e.g., inner diameter) of the hollow mold, such as in a range of about 1 µm to about 50 mm, about 1 µm to about 10 mm, about 1 mm to about 10 mm, about 1 mm to about 5 mm, about 1 µm to about 1 mm, about 10 µm to about 1 mm, or about 100 µm to about 500 µm, and a wall thickness of the Zn-based hollow structure can be varied by tuning processing parameters such as a viscosity and a temperature of the molten Zn (or other molten metal), vacuum pressure, and cooling rate, such as where the wall thickness is varied in a range of about 500 nm to about 5 mm, about 50 µm to about 200 µm, or about 1 mm to about 3 mm. Also, depending on a shape of the hollow mold, vacuum-assisted casting can yield the hollow structure having a complex shape extending along varying longitudinal directions, such as in the form of a coil.

Figure 19:
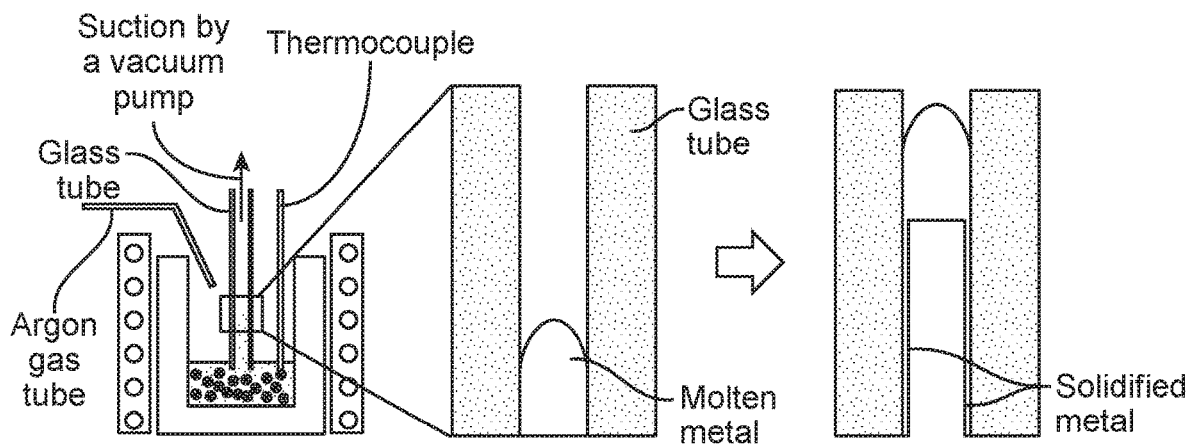
FIG. 19. Fabrication of Zn—WC nanocomposite tube by vacuum-assisted casting.

As a specific example, a Zn—WC nanocomposite tube is fabricated by vacuum-assisted casting as shown in FIG. 19. A Zn—WC nanocomposite preform is placed in an alumina crucible, and is melted under a protection gas at a temperature of about 450° C. One side of a clean glass tube is connected to a vacuum pump, and the other side is dipped into the molten Zn—WC nanocomposite. The molten Zn—WC nanocomposite is drawn by the vacuum pump through the glass tube. The Zn—WC nanocomposite is solidified on an inner surface of the glass tube with a thin wall, thereby forming a hollow tube. The glass tube is removed to extract the hollow Zn—WC tube.

Advantages of vacuum-assisted casting include:
(a) The casting method is a streamlined and cost-effective method to form metallic hollow structures.
(b) An enclosed environment of a hollow mold within which a hollow structure is formed in the method can mitigate against oxidation of a metal.
(c) The casting method can be applied to various metals (e.g., pure metals without incorporation of nanostructures) and various nanocomposites with varying material properties and nano structure concentrations.

Example Embodiments

Some embodiments are directed to a biomedical device including a Zn-based material. In some embodiments, the biomedical device is a biomedical implant. In some embodiments, the biomedical implant is a biodegradable, temporary implant. In some embodiments, the biomedical implant is a stent. In some embodiments, the biomedical implant is a bone implant or other implant, such as a mechanical extension (spring) implant. In some embodiments, the biomedical implant is a biodegradable electronic device. In some embodiments, the biomedical implant is, or includes, a hollow structure including the Zn-based material. In some embodiments, an outer lateral dimension of the hollow structure is in a range of about 1 µm to about 50 mm. In some embodiments, a wall of the hollow structure has a thickness in a range of about 500 nm to about 5 mm.

In some embodiments of the biomedical device, the Zn-based material includes a matrix including Zn, and nanostructures dispersed in the matrix. In some embodiments, the nanostructures have an average dimension in a range of about 100 nm to about 1000 nm; in other embodiments, the nanostructures have an average dimension below about 100 nm and down to about 1 nm. In some embodiments, the nanostructures include a ceramic. In some embodiments, the ceramic is a transition metal-containing ceramic. In some embodiments, the transition metal-containing ceramic is selected from transition metal carbides and transition metal borides. In some embodiments, the transition metal-containing ceramic is WC. In some embodiments, the ceramic is a non-metal carbide. In some embodiments, the ceramic is a post-transition metal oxide. In some embodiments, the nanostructures are dispersed in the matrix at a volume fraction of about 2.5% or greater of the nanocomposite. In some embodiments, the volume fraction of the nanostructures in the nanocomposite is about 5% or greater. In some embodiments, the volume fraction of the nanostructures in the nanocomposite is about 10% or greater. In some embodiments, the matrix including Zn (and in which the nanostructures are dispersed) is polycrystalline and includes grains having an average grain size of up to about 12 µm, up to about 10 µm, up to about 8 µm, or up to about 6 µm, and down to about 4 µm or less.

Additional embodiments are directed to a manufacturing method of a Zn-based material, which includes: (1) heating a matrix material including Zn to form a melt; (2) loading a mixture including a salt and nanostructures over a surface of the melt, such that the salt is heated to form a molten salt including the nanostructures dispersed therein; (3) agitating the melt to incorporate the nanostructures from the molten salt into the melt; and (4) cooling the melt including the nanostructures dispersed therein to form the Zn-based material as a preform. In some embodiments, the nanostructures have an average dimension in a range of about 100 nm to about 1000 nm; in other embodiments, the nanostructures have an average dimension below about 100 nm and down to about 1 nm. In some embodiments, the nanostructures include a ceramic. In some embodiments, the ceramic is a transition metal-containing ceramic. In some embodiments, the transition metal-containing ceramic is selected from transition metal carbides and transition metal borides. In some embodiments, the transition metal-containing ceramic is WC. In some embodiments, the ceramic is a non-metal carbide. In some embodiments, the ceramic is a post-transition metal oxide. In some embodiments, the nanostructures are dispersed in the melt at a volume fraction of about 2.5% or greater of the melt. In some embodiments, the volume fraction of the nanostructures in the melt is about 5% or greater. In some embodiments, the volume fraction of the nanostructures in the melt is about 10% or greater. In some embodiments, the preform is subjected to hot rolling or another shaping procedure into a desired shape.

Further embodiments are directed to a manufacturing method of a hollow structure, which includes providing a melt including a metal, and applying a negative pressure to draw the melt into a hollow mold, followed by solidification of the melt within the hollow mold to form the hollow structure. In some embodiments of the manufacturing method, the metal is selected from Al, Mg, Fe, Ag, Cu, Mn, Ni, Ti, Cr, Co, and Zn. In some embodiments, the melt also includes nanostructures. In some embodiments, the nanostructures have an average dimension in a range of about 100 nm to about 1000 nm; in other embodiments, the nanostructures have an average dimension below about 100 nm and down to about 1 nm. In some embodiments, the nanostructures include a ceramic. In some embodiments, the ceramic is a transition metal-containing ceramic. In some embodiments, the transition metal-containing ceramic is selected from transition metal carbides and transition metal borides. In some embodiments, the transition metal-containing ceramic is WC. In some embodiments, the ceramic is a non-metal carbide. In some embodiments, the ceramic is a post-transition metal oxide. In some embodiments, a volume fraction of the nanostructures in the melt is about 2.5% or greater. In some embodiments, the volume fraction of the nanostructures in the melt is about 5% or greater. In some embodiments, the volume fraction of the nanostructures in the melt is about 10% or greater. In some embodiments of the manufacturing method, applying the negative pressure is through a vacuum pump. In some embodiments, an outer lateral dimension of the hollow structure is in a range of about 1 μm to about 10 mm. In some embodiments, a wall of the hollow structure has a thickness in a range of about 10 nm to about 1 μm.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Fabrication of Zinc-Tungsten Carbide Nanocomposite Using Cold Compaction Followed by Melting Overview:

Zinc (Zn) is an important material for numerous applications since it has pre-eminent ductility and high ultimate tensile strain, as well high corrosion resistivity and good biocompatibility. However, since Zn suffers from low mechanical strengths, most applications would use Zn as a coating or alloying element. In this example, a class of Zn-based material with a significantly enhanced mechanical property is developed. The zinc-10 vol. % tungsten carbide (Zn-10WC) nanocomposite was fabricated by cold compaction followed by a melting process. The Zn-10WC nanocomposites provide a uniform nanoparticle dispersion with little agglomeration, exhibiting significantly enhanced mechanical properties by micropillar compression tests and microwire tensile testing. The nanocomposites provide an over about 200% and about 180% increase in yield strength and ultimate tensile strength (UTS), respectively. The strengthening effect could be attributed to Orowan strengthening and grain refinement induced by nanoparticles.

Introduction:

Zinc has been used in automotive, construction, and biomedical industries due to its high corrosion resistance and good biocompatibility. More specifically, Zn-based alloys are used in many applications such as an anticorrosion agent and galvanization due to its high corrosion resistance. Magnesium additions improve the corrosion resistance of zinc-aluminum alloy galvanized steel, in which the chemical resistivity was enhanced by fast cooling rate, such that small grain size of the primary Zn dendrites was obtained. The good biocompatibility of Zn has broadened its applications to the biomedical field such as orthopedic implants and tissue generations. The desirable degradation rate of Zn in human body makes it a good candidate for potential applications in biodegradable implants. Due to a relatively weak mechanical strength, Zn is used as an alloy addition and coating material in galvanization but not generally for load-bearing structures. It has been a long standing challenge to enhance the mechanical strength of zinc toward a prominent material with a combination of high strength, high corrosion resistivity and great biocompatibility. It would be desired to improve the mechanical properties of Zn for applications such as load-bearing stents.

Since manufacturing processes such as alloying have already reached their limits to improve mechanical properties of Zn, additional methods have been applied to tackle this problem. For example, nanoparticles can be introduced to Zn to improve its properties. One of the most significant problems prohibiting nanocomposites from mass production is often the low wettability between nanoparticles and a metal matrix, where high surface tension of metals hinders nanoparticle incorporation and homogeneous dispersion in scalable methods such as casting. Such nanoparticles agglomeration results in the formation of nanoparticle clusters, so that the improved properties are not achieved.

In this example, high-density and uniformly dispersed tungsten carbide (WC) nanoparticles were used to enhance mechanical properties of Zn. More specifically, Zn-10 vol. % WC (Zn-10WC thereafter) nanocomposites were fabricated by cold compaction followed by a melting process to obtain a more uniform dispersion of nanoparticles. This is a desirable method for scalable manufacturing of Zn matrix nanocomposite with homogeneously dispersed nanoparticles. Furthermore, no significant acute toxicity of WC nanoparticles has been reported yet regarding to its biocompatibility. Thus, Zn-10WC microwires, which have potential for weaving of biomedical stents, were also fabricated by thermal fiber drawing and mechanically tested.

Methods and Experimental Results:

Fabrication of Zn—WC Nanocomposites. Zn—WC nanocomposites were fabricated by cold compaction followed by a melting process. The schematic of the experimental setup is shown in FIG. 1. About 90% volume fraction of Zn micropowders (about 150 μm, Goodfellow) and about 10% volume fraction of WC nanoparticles (about 150 nm, U.S. Research Nanomaterials, Inc., Houston, TX) were weighted and mixed. The powder mixture was blended by a mechanical shaker (SK-O330-Pro) at about 300 RPM for about 30 min. The well-blended Zn—WC powder mixture was added to a cylindrical stainless steel mold (inner diameter: about 19 mm) for cold compaction into a pellet using a hydraulic press under about 85 kN at room temperature. The Zn—WC pellet was melted with manual stirring in an alumina crucible at a temperature of about 450° C. by an electrical resistance furnace under a protection gas of Argon (Ar) for about 30 min. This additional melting process aims at reducing porosity and promoting the nanoparticle dispersion. The final product was cooled down under Ar gas protection. Pure Zn sample was also manufactured in the same conditions as reference.

Figure 2C:
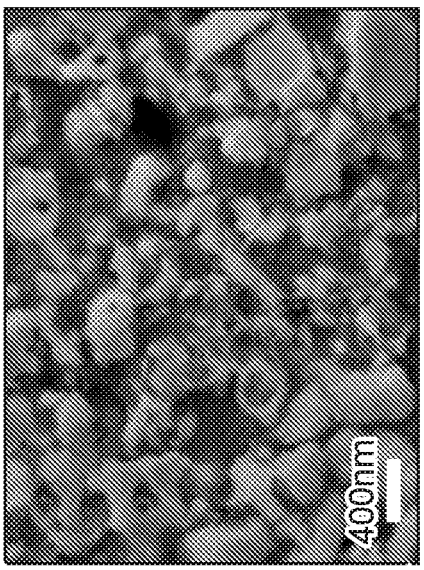
FIG. 2. (a)-(c) Microstructure of zinc-10 vol. % tungsten carbide (Zn-10WC) nanocomposite by scanning electron microscopy (SEM) with different magnifications. (d)-(g) Energy dispersive X-ray spectroscopy (EDS) detection of elements Zn, W, and O, indication Zn matrix, WC nanoparticles, and oxidations. (h) and (i) Grain size of Zn and Zn-10 vol. % WC microstructure by SEM.
Figure 2B:
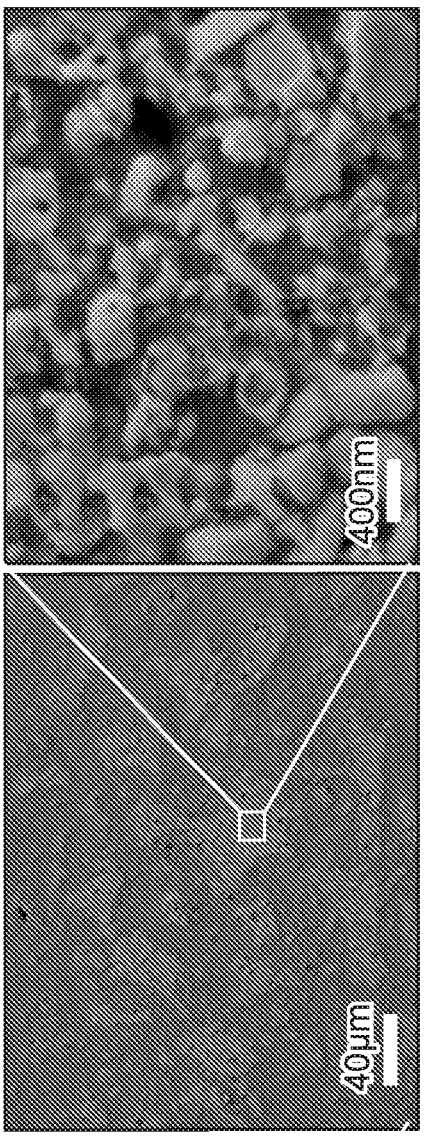
Figure 2A:
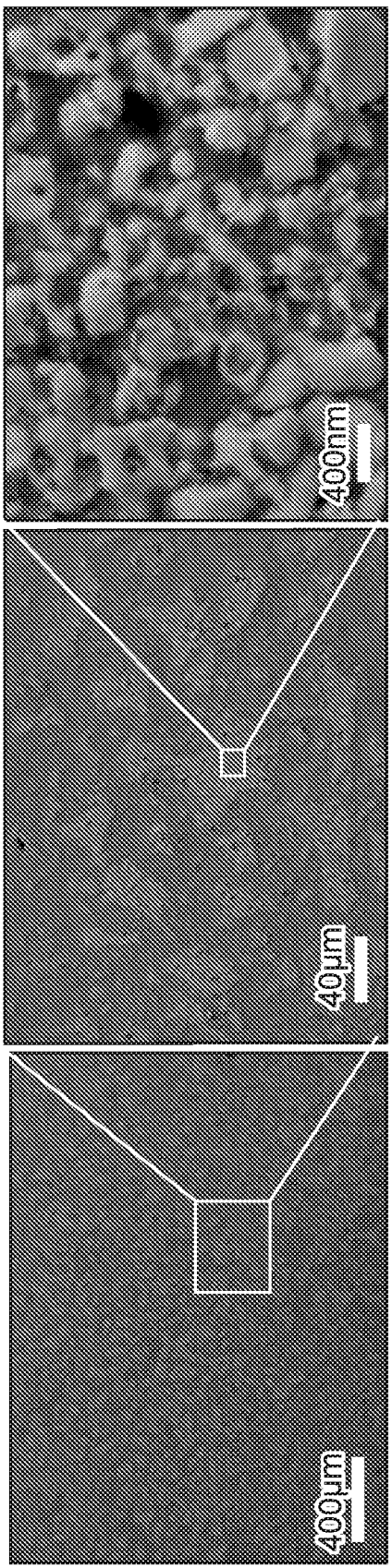
Figure 2F:
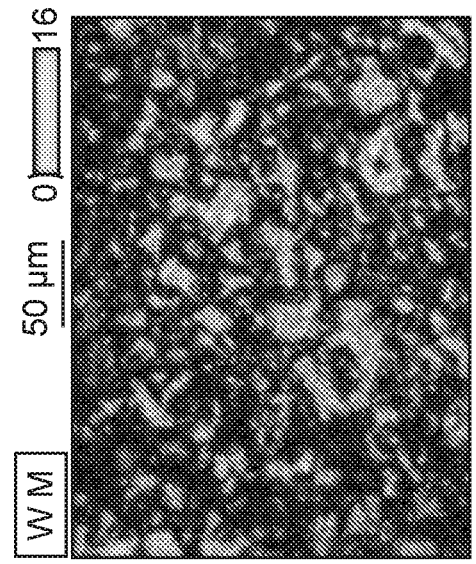
Figure 2E:
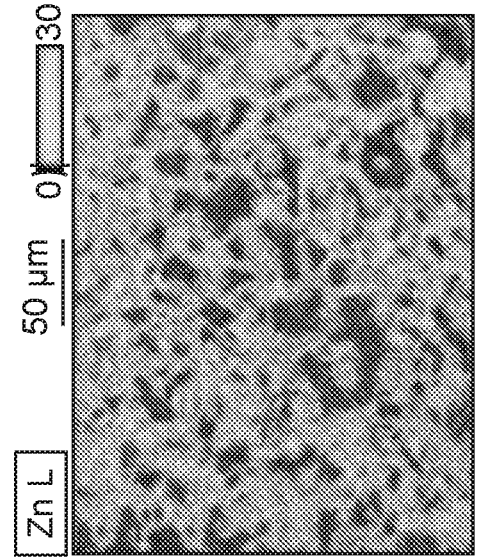
Figure 2D:
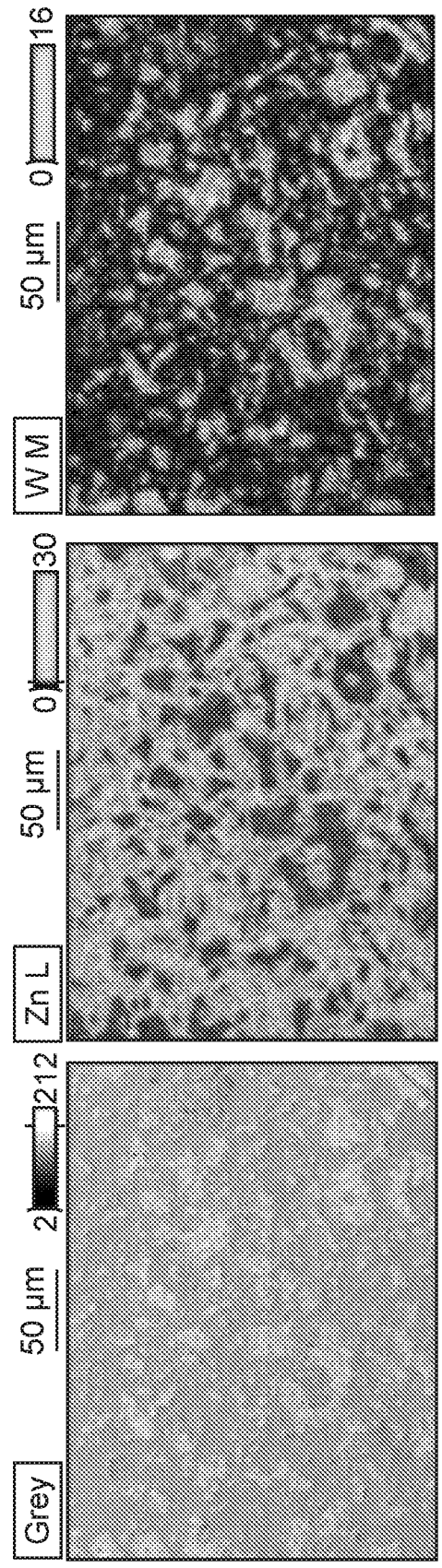

Microstructure Characterization and Nano-Indentation of Zn—WC Nanocomposites. The Zn-10WC nanocomposite samples were characterized by scanning electron microscopy (SEM) for microstructure analysis and by energy dispersive X-ray spectroscopy (EDS) for quantitative element detection and dispersion analysis. The samples went through grinding and polishing (Allied M-Prep 5TM Grinder/Polisher) with a colloidal silica suspension of about 0.5 μm and about 0.02 μm, followed by an extra surface cleaning processing by a low-angle ion milling (about 4 deg., about 3.25 keV with about 10 μA) for about 2 h. FIGS. 2(a)-2(c) show the uniformly distributed about 10 vol. % WC nanoparticles in Zn matrix. The relatively bright- and dark-phase areas corresponded to WC nanoparticles and Zn matrix, respectively. The microstructure of Zn—WC nanocomposite indicates that WC nanoparticles were separated by Zn of a few tens of nanometers. EDS characterization indicates that the nanocomposite sample is composed of zinc (about 77.6 wt. %), tungsten (about 20.2 wt. %), and oxygen (about 2.2 wt. %), as shown in FIGS. 2(d)-2(g). Highly concentrated tungsten carbide was detected in such sample, corresponding to about 11.2 vol. %, which is within an acceptable error range due to the tolerance of the testing machine, implying that WC nanoparticles were substantially fully incorporated into Zn. The average grain size of pure Zn and Zn—WC nanocomposites were also measured to be about 16.9-4.28 μm, respectively, as shown in FIGS. 2(h) and 2(i).

Nano-indentation tests were performed to measure the elastic moduli of pure Zn and Zn-10WC nanocomposite using a nano-indenter (MTS Nano Indenter XP) with a Berkovich tip (about 20 nm radius, diamond). Table 1 presents that the elastic moduli of pure Zn and Zn-10WC nanocomposites are 64.4±8.8 GPa and 102.4±10.1 GPa, respectively. It is evident that the WC nanoparticles improved the elastic modulus of pure Zn significantly.

TABLE 1

Elastic moduli of pure Zn and Zn-10WC nano-composites

| Samples | Pure Zn (GPa) | Zn-10WC (GPa) |
|---|---|---|
| 1 | 62.2 | 102.9 |
| 2 | 55.6 | 100.6 |
| 3 | 67.5 | 112.5 |
| 4 | 66.4 | 94.5 |
| 5 | 70.4 | 101.6 |
| Average | 64.4 | 102.4 |
| Standard deviation | 5.1 | 5.8 |

Figure 3A:
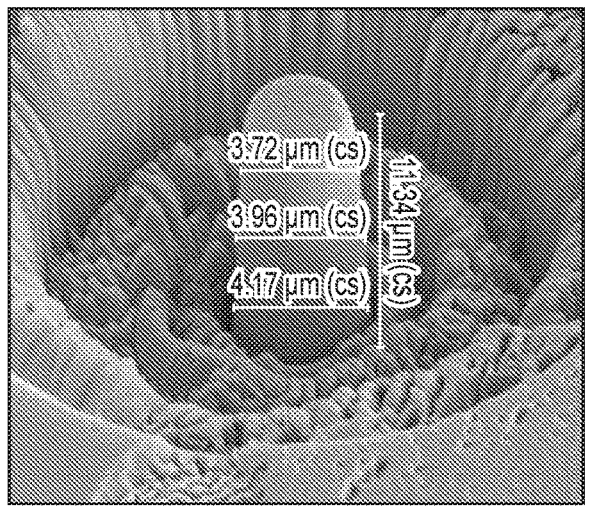
FIG. 3. (a)-(d) Zn and Zn-10WC micropillars and their corresponding micropillar compression test results.
Figure 3B:
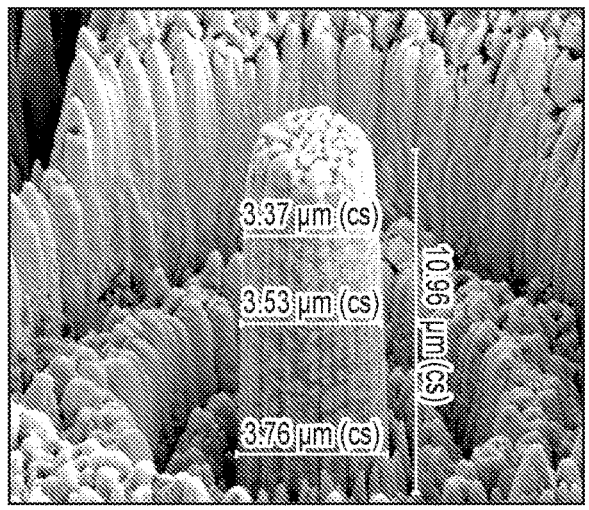
Figure 3C:
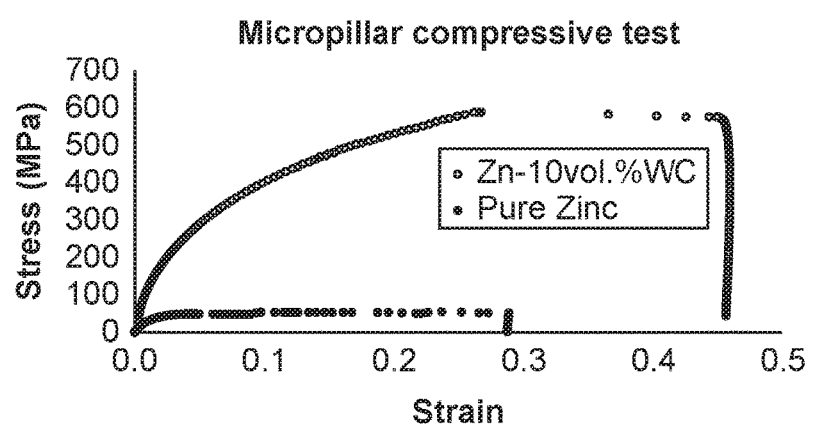

Zn—WC Nanocomposite Micropillar Compression Test for Yield Strength Measurement. In addition to evaluating the mechanical strength, Zn-10WC nanocomposites were characterized by the microcompression tests using a nano-indenter (MTS Nano Indenter XP) with about 10 μm diameter-flat punch. Focus ion-beam (FEI Nova 600 Nanolab Dual-Beam FIB-SEM) was used to machine micropillars of about 10 μm in height and about 3.5 μm in diameter on nanocomposites samples and reference samples in FIGS. 3(a) and 3(b), respectively. The results showed that nanocomposite micropillars have a uniform and dense nanoparticle dispersion on the surface. The compression data are shown in FIG. 3(c), where Zn—WC samples obtained significantly higher yield strength (about 118 MPa), more than five times higher than the pure Zn sample (about 22 MPa). FIG. 3(d) contains Table 2, which shows the yield and ultimate compressive strengths of the pure Zn and Zn-10WC nanocomposites in the compression tests. The yield strength of the Zn and Zn-10WC nanocomposites are 23.4±3.6 MPa and 116.4±20 MPa, respectively. The average ultimate compressive strength of pure Zn and Zn-10WC are about 51 MPa and about 507 MPa. It is evident that WC nanoparticles significantly enhanced the mechanical strength of Zn.

Tensile Testing Using Zn—WC Nanocomposites Microwires. Zn-10WC nanocomposite microwires were fabricated by thermal fiber drawing method, while using borosilicate glass tubing (inner diameter: about 1.0 mm, and outer diameter: about 6.5 mm) as a cladding material. The nanocomposite wires could serve as starting materials for stent fabrication. The nanocomposite preform was thermally drawn at about 820° C. (feeding speed: about 100 μm/s, and pulling speed: about 2.5 mm/s) to obtain Zn—WC microwires of about 200 μm in diameter with a draw-down ratio of about 25. The glass cladding was etched away by about 49% aqueous hydrofluoric acid to the cladding thickness of about 0.1 mm, whereas the remaining glass shell was manually removed.

Figure 4A:
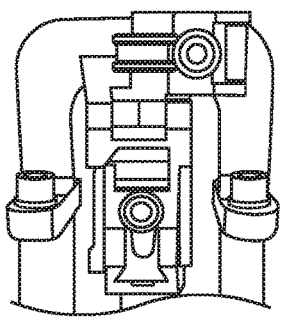
FIG. 4. (a) Zn-10WC microwire tensile testing setup. (b) Tensile testing result of stress-strain curve for Zn-10WC and pure Zn. (c)-(e) SEM images of microwire samples, with nanoparticles on the surface. (f) Longitudinal cross section image of Zn-10WC microwire with well-distributed WC nanoparticles. (g) Table 3 for yield and ultimate tensile strength of pure Zn and Zn-10WC nanocomposites microwires.
Figure 4B:
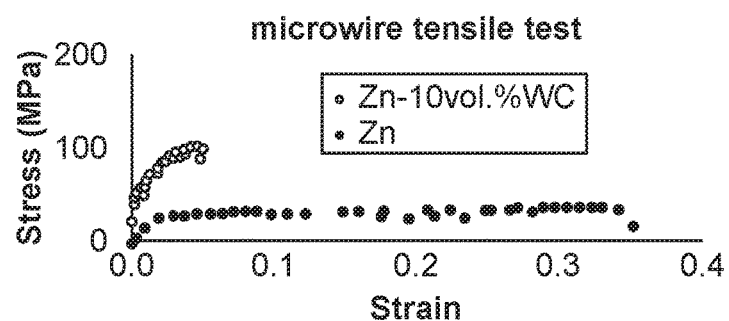
Figure 4C:
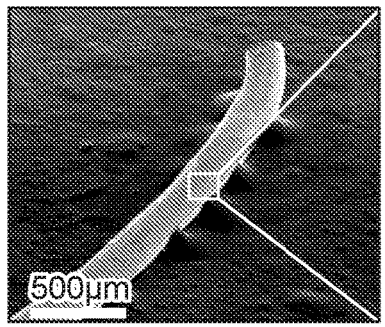
Figure 4D:
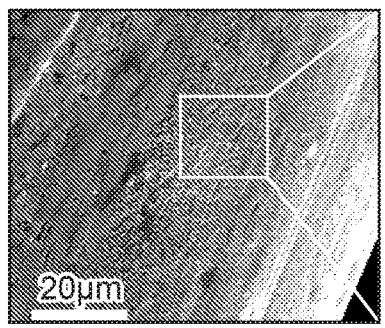
Figure 4E:
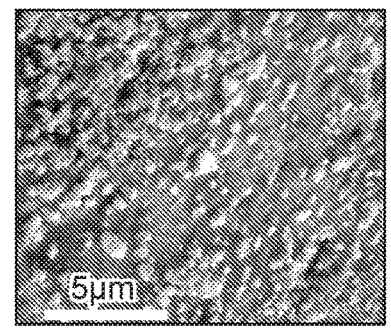
Figure 4F:
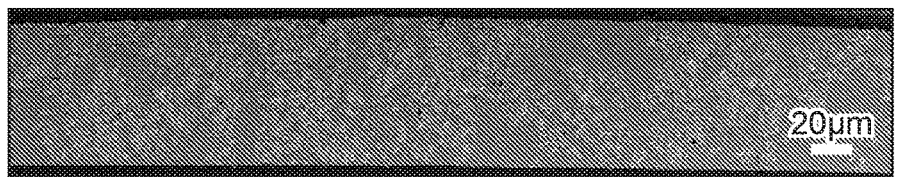

The Zn-10WC nanocomposite microwires were then tensile tested using a dynamic mechanical analyzer (Q 800 DMA, TA instruments). The results of the stress-strain curves were obtained for both nanocomposite and pure zinc microwires, as shown in FIGS. 4(a) and 4(b). The pure Zn wires obtained a ultimate tensile strength (UTS) of about 37 MPa, yield strength of about 18 MPa, and ultimate tensile strain of about 35.1%, while Zn-10WC nanocomposite microwires exhibited an UTS of about 103 MPa, yield strength of about 55 MPa, and ultimate tensile strain of about 5.0%. FIG. 4(g) contains Table 3, which presents the yield and ultimate tensile strengths of the pure Zn and Zn-10WC nanocomposites in the tensile test. The yield strength of the pure Zn and Zn-10WC nanocomposite are 13.4±4.6 MPa and 54.8±8.8 MPa, respectively. The average ultimate tensile strength of pure Zn and Zn-10WC nanocomposites are about 27 MPa and about 102 MPa. Further verification of WC nanoparticle dispersion in the microwires was obtained through SEM by inspecting the microwire surface and longitudinal cross section, as shown in FIGS. 4(c)-4(f).

Discussion:

Zn-10WC nanocomposites were successfully fabricated by cold compaction followed by a melting process. The method was able to efficiently incorporate WC nanoparticles into Zn while avoiding potential oxidation. During the melting process, molten Zn infiltrated into the nanoscale gaps among WC nanoparticles, mitigating against the nanoparticles agglomeration. WC nanoparticles in a molten Zn are then dispersed and stabilized by a thermally activated dispersion mechanism. Furthermore, microstructure characterization, nano-indentation tests, micropillar compression tests, and microwire tensile tests were performed. The mechanical properties of the Zn—WC nanocomposites were substantially enhanced for two major reasons: Orowan strengthening and grain refinement. WC intrinsically provides a high hardness of about 2600 HV and an ultimate compression strength of about 2.7 GPa. This Orowan strengthening by WC nanoparticles could be generally determined by:

$$\Delta \sigma_{Orowan} = \frac{\varphi G_m b}{d_p} \left( \frac{6 V_p}{\pi} \right)^{1/3}$$

where φ is a constant equal to about 2, $G_m$ is the shear modulus of Zn, b is the Burgers vector, $V_p$ is the volume fraction, and $d_p$ is the reinforcement size. With a rough estimation assuming perfectly homogeneous dispersion, and $G_m$=about 43 GPa; $V_p$=about 10%; b=about 0.27 nm; $d_p$=about 200 nm; φ=2, the strengthening could be determined to be about 66.9 MPa.

Further strengthening could also be contributed to the grain refinement given that nanoparticles impeded the solidification front. The average grain size of the Zn—WC nanocomposite was refined from about 16.9 μm to about 4.28 The grain refinement could enhance the mechanical strength through the grain boundary strengthening, referred as Hall-Petch strengthening, corresponding to the equation:

$$\Delta\sigma_y = kd^{-1/2}$$

where $\Delta\sigma_y$ is the yield strength, k is the strengthening coefficient ($k_{Zn}$=about 0.22 MPa m$^{1/2}$) and d is the grain size. $\Delta\sigma_y$ is roughly calculated to be about 52.8 MPa based on the equation. It should be noted that the theoretical predictions do not exactly match the experimental results, possibly due to defects and non-ideal nanoparticle dispersion.

A few factors should be considered to account for variation of results and error. Stress concentrations and crack propagations can occur at the micro/nanoscale porosities formed in material processing. Surface defects (notches and dimples) on the microwires that were created during the glass removal process could lead to a stress concentration. The residual stress or defects by the clamp in the DMA tensile machine can also induce a reduction in the strength of microwires under testing. In addition, the pillar size (about 3.5 μm in diameter) in the microcompression test is close to the about 2 μm in the average grain size of Zn in the Zn-10WC nanocomposite, which can affect the strength of the Zn-10WC nanocomposite.

Conclusions:

Zn—WC nanocomposite with a high volume fraction of WC nanoparticles has been successfully fabricated by cold compaction followed by a melting process. Zn—WC nanocomposite microwires were fabricated by thermal fiber drawing so that they could be used for stent weaving. WC nanoparticles were well dispersed and distributed in the Zn matrix. Zn—WC nanocomposites provide significantly enhanced mechanical properties, mostly due to Orowan strengthening and grain refinement.

Example 2

Bioabsorbable Zinc Nanocomposite

Overview:

The lack of strong bioabsorbable materials suitable for implant applications dictates permanent implant materials to be used for clinical cases that specifies temporary support while tissue integrity is restored. However, there are several complications associated with the long-term presence of implants in vivo, and permanent implants generally cannot be used on pediatric patients because they do not accommodate growth. Bioabsorbable metals are an attractive choice for temporary implants since metallic implants have a proven history of biocompatibility in vivo and have higher mechanical strength and toughness for high-stress applications. Unfortunately, current bioabsorbable metals, such as iron and magnesium, have inadequate degradation times and mechanical properties. Zinc has promise as a bioabsorbable metal, but the low tensile strength of pure zinc constrains its application as an implant material. This example reports a zinc-tungsten carbide nanocomposite as a material for bioabsorbable metallic implants. Cold compaction and melting methods were used to fabricate zinc-tungsten carbide nanocomposites that enhanced the mechanical properties over pure zinc. Additionally, tungsten carbide nanoparticles did not impact the favorable biodegradation rate of pure zinc as measured by inductively coupled plasma optical emission spectrometer and mass spectrometer. These results show the promise of zinc-tungsten carbide nanocomposites for biomedical applications with the goal of creating safe and efficacious bioabsorbable metallic implants for many clinical applications.

Introduction:

Permanent implant materials are frequently used in clinical cases that specify their presence temporarily. These situations are less than ideal as the long-term presence of implants are associated with many complications, including infections, implant migration, altered tissue growth, stress shielding, toxicity, and subsequent surgeries. Permanent implants are also unsuitable for the pediatric patient population due to their inability to accommodate growth. Conversely, bioabsorbable implants provide transient support that allows for the restoration of a tissue's physiological integrity followed by substantially complete reabsorption of the implant. Most bioabsorbable implants are currently polymer-based; however, their lower mechanical strength and viscoelastic behavior have constrained their clinical use for load-bearing applications, such as bone staples, fixation plates, anterior cruciate ligament (ACL) screws, cardiovascular and nonvascular stents, and spinal fusion cages and clips. Bioabsorbable metallic implants are an attractive alternative. Metals have higher mechanical strength and toughness for load-bearing applications, and have biocompatibility in vivo.

Magnesium and iron-based alloys can be used for bioabsorbable metallic implants. Degradation of magnesium-based implants produces a soluble, non-toxic oxide that is harmlessly cleared from the body via the kidneys and magnesium is an abundant cation in the human body where it serves as a co-factor for many enzymes, and stabilizes the structures of DNA and RNA. However, the drawbacks to magnesium include its rapid corrosion rate and hydrogen production. Additionally, magnesium has constrained ductility, which has specified alloying with potentially harmful metals (e.g., aluminum, zirconium, or thorium) or significant metallurgical manipulation. Iron and its alloys also can be used to fabricate bioabsorbable metallic implants but with constrained success. While mechanically stronger than magnesium, the in vivo degradation is too slow, and there is slow clearance of corrosion products in vivo. Overall, further advancements are desired to unlock the full potential of absorbable metallic implants.

Zinc is a suitable candidate for bioabsorbable metallic implants. As an element in basic biological functions, zinc is involved for the proper function of numerous proteins that regulate the proliferation, differentiation and apoptosis of cells, and is involved in nucleic acid metabolism, signal transduction, and gene expression. Therefore, living tissues have transport mechanisms that regulate zinc levels, which combat against toxic cellular zinc levels. Additionally, zinc implants demonstrate steady corrosion rates with no severe inflammation, platelet aggregation, thrombosis or intimal hyperplasia. Furthermore, zinc has greater elongation to failure (about 60-80%) than magnesium (about 13%) and iron (about 18%). This can positively influence the fatigue resistance and fracture toughness of zinc-based implants. However, the mechanical strength of pure zinc is not suitable for load-bearing applications. Alloys can be used to improve the mechanical strength, but at the cost of other favorable properties, such as corrosion rate, ductility and biocompatibility. Additionally, there are constraints to the extent that the properties of metals can be improved through alloying.

Metals reinforced with nanoparticles are a class of materials that provide significantly enhanced mechanical, thermo-physical, and electrical properties. Nanoparticles can be added to zinc melts to significantly enhance zinc's mechanical properties. One promising candidate is tungsten carbide. Specifically, the high mechanical strength of tungsten carbide is especially attractive for implant applications, but it also demonstrates good electrical conductivity, high melting point, and high thermal stability as well as thermal conductivity. Additionally, tungsten carbide nanoparticles are non-cytotoxic in vitro. Therefore, tungsten carbide nanoparticles are a desirable candidate for nanoscale reinforcement of zinc matrices. In this example, cold compaction was used to produce zinc-tungsten carbide nanocomposites with varying nanoparticle volume percentages, and thermal fiber drawing was used to fabricate microwires. The impact that tungsten carbide nanoparticles have on zinc's hardness and degradation rate in simulated body fluid was evaluated. Additionally, the change in surface morphology after immersion testing was evaluated.

Materials and Methods:

Fabrication of Zinc-Nanocomposites

Figure 5:
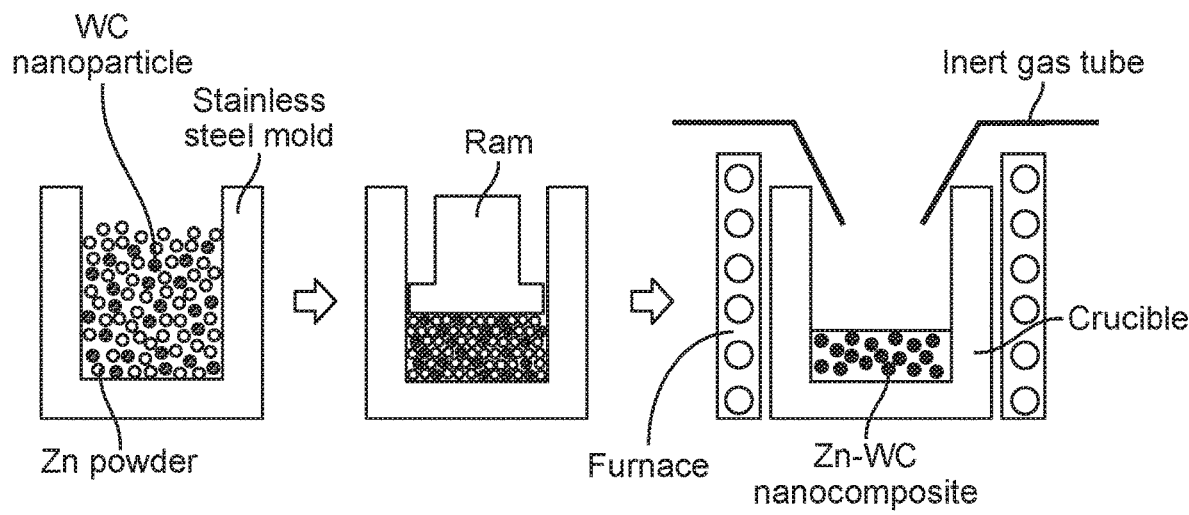
FIG. 5. Schematic of zinc-tungsten carbide nanocomposite fabrication via cold compaction and melting.

Cold compaction and melting were used to fabricate zinc-tungsten carbide nanocomposites (FIG. 5). Briefly, tungsten carbide nanoparticles, with about 200 nm average diameter, at varying volume percentages (0, about 2.5, about 5, about 7.5 and about 10 vol. %) were well-mixed with zinc powders (about 50 μm average diameter) by mechanical shaking at about 300 RPM for about 1 h. The mixed powder was added to a cylindrical, stainless steel mold with an inner dimeter of about 2 cm, and about 58 kN was applied to the powder mixture by a hydraulic press machine to form a zinc-tungsten carbide pellet. Nanocomposite pellets were then melted under an inert atmosphere (argon gas) at about 450° C. for about 30 min in an induction heater and allowed to cool to room temperature.

Microhardness Testing

Vickers hardness test was performed to assess the effect of tungsten carbide nanoparticles on zinc's hardness. Briefly, the hardness was measured using a Leco microhardness tester. The average hardness of the specimens was determined using 12 indentations on the polished surface at about 100 gf load with about 10 sec loading time. To avoid the interference between stress fields of closely spaced indentations or perturbations caused by specimen edge effects, separation distances of at least about 500 μm were maintained between adjacent indentation sites. No indentations were placed closer than about 1000 μm from the nearest free edge of the specimen. The H values were calculated by:

$$H = \frac{1.8544 \times F}{(2a)^2}$$

where F is the applied force and 2a is the diagonal of the diamond indentation impression.

Fabrication of Zinc-Nanocomposite Microwires

Figure 6:
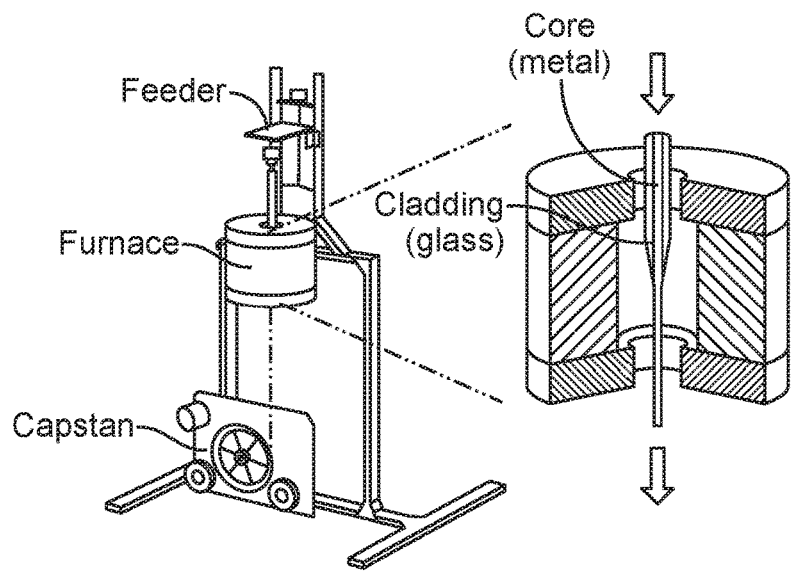
FIG. 6. Schematic of thermal drawing tower.

Thermal fiber drawing was used to fabricate zinc-tungsten carbide nanocomposite microwires (FIG. 6). The nanocomposite pellets produced by cold compaction were melted under Argon gas flow at about 450° C. in an induction heater. The molten zinc-tungsten carbide nanocomposite was drawn into an about 30 cm-long borosilicate glass tube (inner diameter: about 1 mm, and outer diameter: about 6.5 mm) by a vacuum pump. The glass preform embedded zinc-tungsten carbide nanocomposite was clamped in a feeder, and subsequently fed into an electric resistance furnace with a feeding speed of about 100 μm/s. The furnace temperature was set at 820° C. in accordance with the softening point of borosilicate glass. The fiber was pulled down at a constant speed of about 2.5 mm/s as the preform continued to be fed into the furnace. Under these feeding and pulling speeds, the zinc-tungsten carbide nanocomposite wires fabricated for the degradation testing had a diameter of about 200 μm.

Simulated Body Fluid (SBF) Preparation

The SBF used in this example had ionic concentrations substantially equal to that of human blood plasma, except $Cl^-$ and $HCO_3^-$, as well as a substantially equal pH value as human blood plasma (Table 4). The solution was prepared by sequentially dissolving NaCl, $NaHCO_3$, KCl, $K_2HPO_4.3H_2O$, $MgCl_2.6H_2O$, $CaCl_2$, and $Na_2SO_4$ in deionized water under magnetic stirring at about 37° C. Each chemical was added once the previous solution became clear. The final pH was adjusted with about 1 M hydrochloride to bring the final pH to about 7.4. The solution was sterile filtered through an about 0.22 μm membrane filter, and stored at about 4° C.

TABLE 4

Ion concentration and pH values of simulated body fluid versus human blood plasma

| Ions | SBF (mM) | Human Blood Plasma (mM) |
| --- | --- | --- |
| $Na^+$ | 142 | 142 |
| $K^+$ | 5 | 5 |
| $Mg^{2+}$ | 1.5 | 1.5 |
| $Ca^{2+}$ | 2.5 | 2.5 |
| $Cl^-$ | 147.8 | 103 |
| $HCO_3^-$ | 4.2 | 27 |
| $HPO_4^{2-}$ | 1 | 1 |
| $SO_4^{2-}$ | 0.5 | 0.5 |
| pH | 7.4 | 7.4 |

Immersion Testing

The immersion test was carried out according to ASTM G31-72. The total immersion time was about 14 days and the temperature was maintained at about 37° C. during the experiments. The weight and dimensions of each sample were recorded at the start of the experiments, and a minimum SBF volume-to-specimen surface area of about 0.4 mL/mm² was used. For the composition test, the SBF volume-to-specimen surface area was about 1 mL/mm². At each time point, the SBF solution was collected and replaced with fresh SBF solution to maintain sink condition. Inductively coupled plasma optical emission spectrometer (ICP-OES) was employed to measure the concentration of zinc ion and ICP-mass spectrometer (ICP-MS) was used to measure tungsten ion concentration which had dissolved from the nanocomposite wires. Three readings were taken to obtain the average values for the metal ions released. For analyses, a custom multi-element calibration standard (Zn and W, 1000 μg/L, PerkinElmer) was diluted to create matrix-matched calibration curves that were established from at least five plotted points. The analytical detection limits for Zn was 0.1 ppm, and 0.1 ppb for W. An average of three measurements was taken for each group at each time point.

Microarchitecture Characterization

The distribution and dispersion of tungsten carbide nanoparticles as well as changes in the surface morphologies after immersion were evaluated by environmental scanning electron microscopy (ESEM). Additionally, the composition of the materials was evaluated by energy dispersive X-ray spectroscopy (EDS). The analysis was conducted with a ZEISS Supra 40 Variable Pressure SEM device (VP-SEM) equipped with a Thermo Noran System 6 EDS system at an accelerating voltage of about 15 kV.

Statistical Analysis

The statistical significance of differences between groups was determined using one-way ANOVA followed by Tukey post-hoc analysis. A student's t-test was performed to compare means from the surface area-to-volume immersion test. The SPSS statistical software package 24.0 for Windows (IBM, Armonk, NY, USA) was used for statistical analysis. Significance was established by a value of p<0.05. Data are expressed as mean±standard deviation (SD).

Results and Discussion:

Zinc-Tungsten Carbide Nanocomposite Microstructure

Figure 7A:
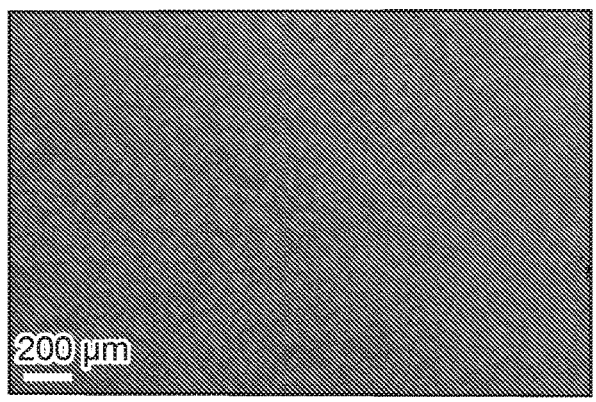
FIG. 7. SEM images of Zn—WC nanocomposites acquired at different magnifications showing the distribution and dispersion of WC nanoparticles in Zn. (A) Distributed WC nanoparticle in a Zn matrix (scale bar=200 µm). (B) and (C) Regions of high- and low-density WC nanoparticles are present throughout the Zn matrix (scale bar=100 µm and 20 µm, respectively). (D) Dense region of WC nanoparticles. (★) void; (■) Zn and (▲) WC nanoparticle (scale bar=200 nm).
Figure 7B:
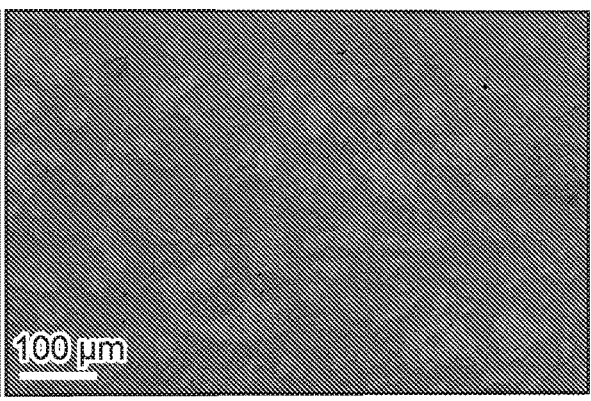
Figure 7C:
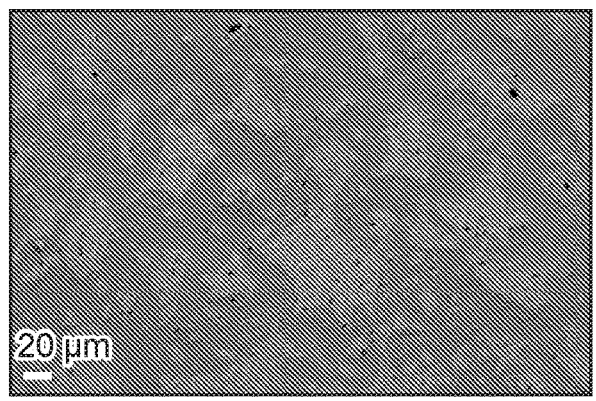
Figure 7D:
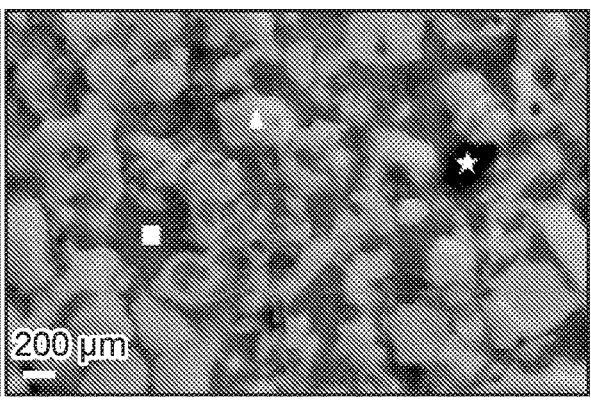

SEM images in FIG. 7A show tungsten carbide nanoparticles dispersed in a zinc matrix. The bright-phase areas correspond to tungsten carbide nanoparticles and the dark-phase regions are zinc-rich. Pseudo-agglomerations of tungsten carbide nanoparticles varying in size from about 20 µm to about 100 µm can be seen in FIGS. 7B and 7C, and correspond to the initial sizes of the zinc powders (average diameter: about 50 µm; diameter range: about 20 µm to about 100 µm with maximum diameter of about 150 µm). These pseudo-agglomerates form due to the attractive van der Waals forces between the nanoparticles in the molten metal. Some voids were observed (FIG. 7D) and are likely caused by displacement of the tungsten carbide nanoparticles during sample processing in areas where molten zinc did not permeate. However, zinc can be seen in gaps between nanoparticles that are tens of nanometers in size, indicating a reasonable wettability between nanoparticles and molten zinc. Therefore, van der Waals interactions seem to be the primary mechanism driving nanoparticle pseudo-agglomeration. The presence of these high- and low-density nanoparticle regions cause heterogeneity of the material's mechanical properties. Material processing can be used to achieve uniform nanoparticle distribution in metal matrices. For instance, a combination of semisolid-state mechanical mixing and liquid-state ultrasonic processing can be used to improve nanoparticle wetting and disrupt van der Waals interactions.

Microhardness of Zinc-Tungsten Carbide Nanocomposites

Figure 8:
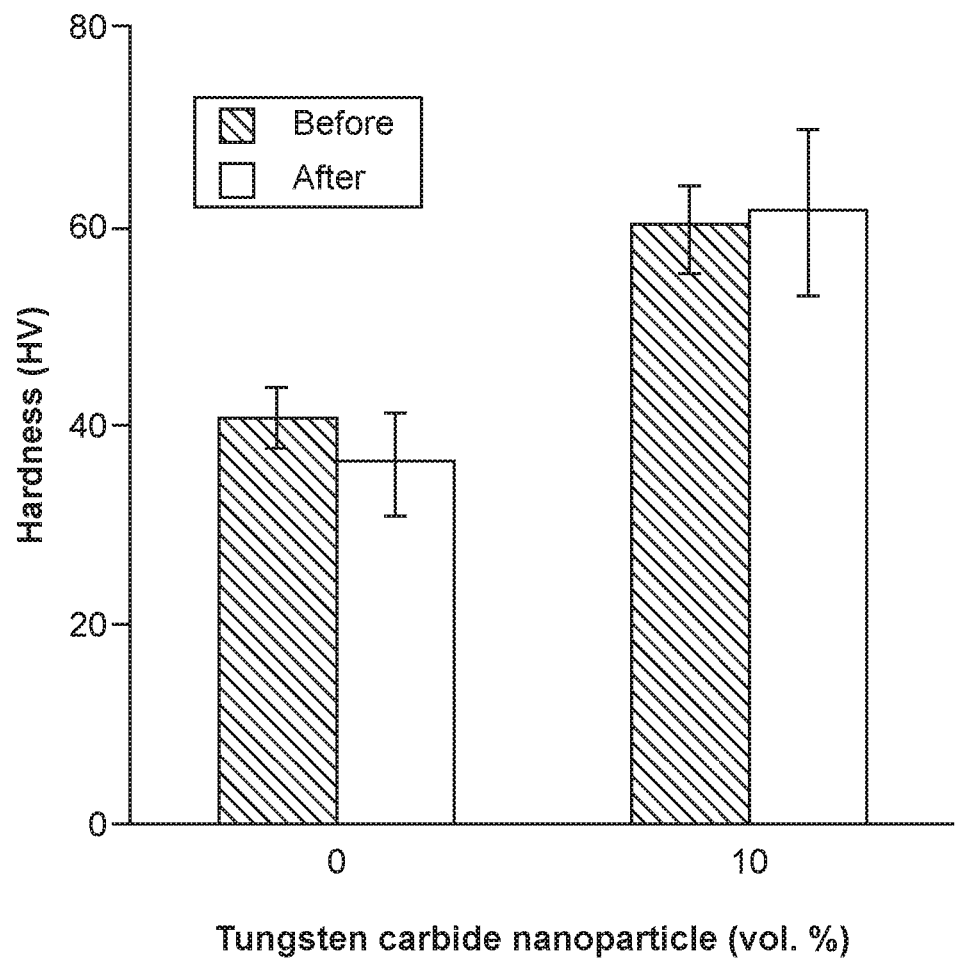
FIG. 8. Comparing the Vickers hardness of pure Zn and Zn—WC (about 10 vol. %) nanocomposites before and after 14 days of immersion in simulated body fluid (SBF) (n=14).

Vickers hardness was determined for both pure zinc and zinc-tungsten carbide nanocomposites with about 10 vol. % nanoparticles. The Vickers hardness for pure zinc was about 40.7 HV and about 60.4 HV for zinc-tungsten carbide nanocomposite (FIG. 8). The presence of tungsten carbide nanoparticles enhanced the hardness by about 50%, and this enhancement is likely caused by the tungsten carbide nanoparticles blocking slip along the weakest planes at the yield point. The hardness was measured after 14 days of immersion in the SBF solution and no statistically significant change in Vickers hardness was detected. It is worth noting that factors such as defects and microporosities likely impacted the Vickers hardness and caused lesser enhancement in the zinc-tungsten carbide samples.

Biodegradation of Zinc-Tungsten Carbide Microwires

Figure 9:
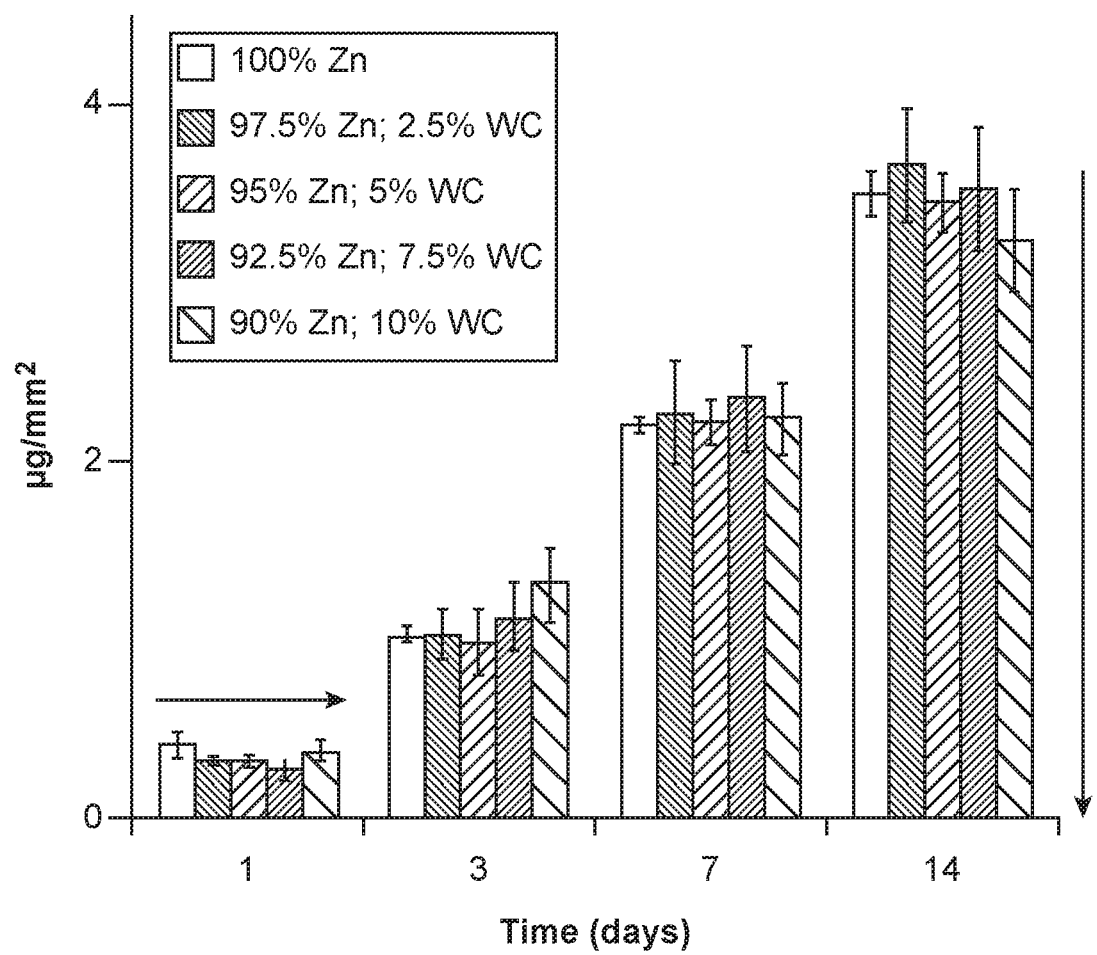
FIG. 9. Static immersion of Zn—WC microwires in SBF (n=3). No statistically significant difference in Zn release between samples with increasing WC nanoparticle content based on one-way ANOVA.

The results from the immersion test show that the amount of zinc ions released from the zinc-tungsten carbide nanocomposites are statistically substantially the same regardless of the volume fraction of tungsten carbide nanoparticles. Additionally, the amount of zinc ions released from zinc-tungsten carbide nanocomposites was similar to that of pure zinc microwires (FIG. 9). These findings indicate the favorable degradation rate of zinc will not be sacrificed by the addition of ceramic nanoparticles designed to improve the mechanical performance. The degradation rate of the zinc-tungsten carbide microwires was linear during the 14 day study length. The average corrosion rate of each sample per each day was about 0.25 to about 0.4, about 0.33 to about 0.43, about 0.31 to about 0.33 and about 0.25 to about 0.26 $\mu g/mm^2$/day at days 1, 3, 7 and 14, respectively. These levels of zinc ion release are likely to be well tolerated in vivo. As an element in basic biological functions, zinc is involved for the proper function of numerous proteins that regulate the proliferation, differentiation and apoptosis of cells, and is involved in nucleic acid metabolism, signal transduction, and gene expression. As such, zinc can be found in every tissue but it primarily accumulates in muscle and bone. The National Academy of Medicine has set the recommended daily intake value of zinc at 2-3 mg/day for infants up to 8-11 mg/day for adults, and normal serum and urine levels in adults have been reported as 1 µg/mL and 0.5 mg/g creatinine, respectively. Additionally, the Agency for Toxic Substances and Disease Registry (ATSDR) has set the minimal risk levels of zinc at 0.3 mg Zn/kg/day. However, the cellular toxicity risk is low since living tissues have transport mechanisms that regulate zinc levels, and combat against toxic zinc levels. Additionally, excess zinc is readily eliminated from the body via urine and feces. Therefore, the toxic potential of the daily dose of zinc released from a zinc-based implant should be negligible.

No detectable levels of tungsten were released from zinc microwires with up to about 10 vol. % tungsten carbide nanoparticles after 14 days of static immersion in SBF as measured by ICP-MS with a lower quantifiable limit of 0.5 ppb (0.5 ng/mL). Environmental exposure is the primary mechanism by which tungsten enters the human body, and normal tungsten blood and urine levels have been reported as about 1-6 µg/L and about 0.085 µg/L, respectively. Tungsten is not metabolized in vivo and any absorbed tungsten is primarily eliminated via urine. However, tungsten has been shown to accumulate in the kidneys and spleen, and in bone tissue long term. Tungsten has historically been considered an inert metal; however, accumulation of tungsten within the bone may alter the bone biology as well as result in higher exposure levels within the bone marrow, which contains part of the developing immune system. For elemental tungsten to be detectable, the tungsten carbide nanoparticles would first escape the bulk metal and undergo oxidation to release tungsten. Therefore, it is more likely that cells will encounter tungsten carbide nanoparticles over elemental tungsten. With regard to studies on cytotoxicity and genotoxicity of tungsten carbide nanoparticles, tungsten carbide nanoparticles could enter various cell types, but do not yield a toxic response. Taken altogether, the toxic potential of the tungsten and tungsten carbide nanoparticles released from a zinc-based implant should be negligible.

Figure 10A:
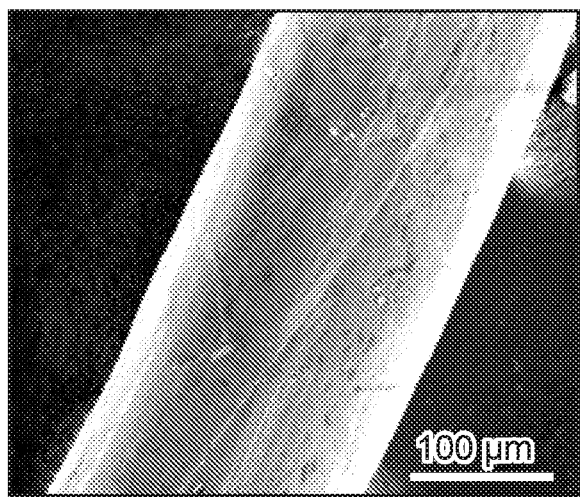
FIG. 10. SEM images of Zn—WC nanocomposite microwire (A) before and (B) after immersion in SBF for 14 days. A layer of biodegradation products covered the surface and were primarily composed of Ca, O, P and to a lesser extent Mg and Zn elements.
Figure 10B:
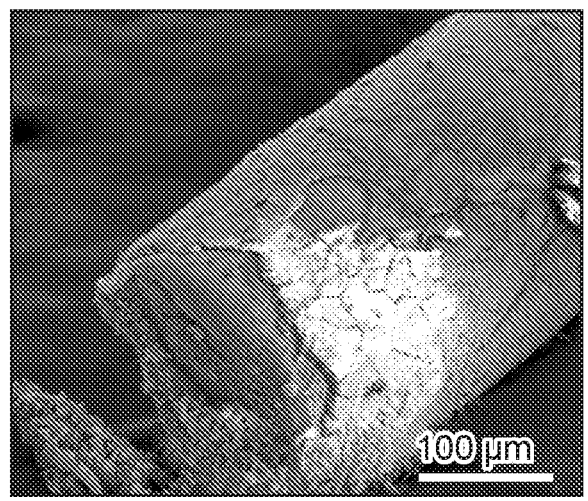

FIG. 10 shows the surface morphologies of the zinc-tungsten carbide nanocomposite microwires before (FIG. 10A) and after (FIG. 10B) soaking in SBF for 14 days. It can be seen that the surface immersed in the SBF for 14 days was similar to that before testing; however, a large amount of salt precipitation was attracted to the sample's surface and formed a layer covering the surface. According to EDS results, the chemical composition of the layer included primarily Ca, O, P and to a lesser extent Mg and Zn elements. The element Zn originated from the substrate, and the remaining elements came from the SBF solution which were deposited on the surface. Trace amounts of silicon were also detected on the surface and likely came from residual glass used during the microwire fabrication process. It is reasonable to assume that the layer of biodegradation products may contain ZnO, Zn(OH)$_2$, Zn$_3$(PO$_4$)$_2$, and Ca$_3$(PO$_4$)$_2$ based on the composition and insolubility of by-products in water and SBF.

Conclusions:

A combination of cold compaction and melting was used to successfully fabricate zinc-tungsten carbide nanocomposites. The materials' microhardness was characterized by Vickers hardness testing, and the release of metallic ions into simulated body fluid during immersion testing was measured by ICP-OES and -MS. Zinc nanocomposites with about 10% volume of tungsten carbide had about 50% increase in hardness compared to pure zinc, and the hardness did not change after 14 days of biodegradation testing. Evaluation of the biodegradation showed that the tungsten carbide nanoparticles did not impact the release rate of zinc ions from the microwires relative to pure zinc microwires, and no detectable levels of tungsten ions were released from any of the nanocomposite samples with a lower detection limit at 0.5 ppb. These results indicate the zinc-tungsten carbide nanocomposites retain the favorable biodegradation profile of pure zinc desired for bioabsorbable metallic implant applications while enhancing the mechanical properties. Further material characterization can be performed, including fatigue testing, electrochemical biocorrosion analysis, and in vitro and in vivo biocompatibility testing.

Example 3

Strong and Ductile Zinc-Tungsten Carbide Nanocomposite as Biodegradable Material Overview:

This example presents the manufacturing and the characterization of zinc-tungsten carbide (Zn—WC) nanocomposite as a potential biodegradable material. A highly homogeneous nanoparticle dispersion in the bulk Zn—WC nanocomposite was achieved by molten salt-assisted stir casting followed with hot rolling. Furthermore, with incorporation of just a modest amount of about 4.4 vol. % nanoparticles, Vickers microhardness and ultimate tensile strength were enhanced more than about 50% and about 98%, respectively, while retaining a high ductility over about 70%. However, electrical and thermal conductivities were reduced by about 12% and about 21%, respectively. With the significantly enhanced mechanical strength, nanoparticles reinforced zinc metal obtains a combination of good toughness, biocompatibility and degradability, and can be used as a biodegradable material for applications, such as vascular bioresorbable stents and bioresorbable electronics.

Introduction:

Unlike permanent metallic biomaterials, such as titanium alloys, stainless steel and cobalt-chromium alloys, biodegradable materials including Zn, Mg, Fe, and some biodegradable polymers provide surgery flexibility where extra surgery to take out implants may be omitted. These materials will gradually degrade inside the human body after diseases or injuries are cured. Among these biodegradable materials, metals stand out, owing to their mechanical strength, integrity, and stiffness. For instance, Mg has reasonable mechanical strength and promising biocompatibility. However, a few problems still remain for Mg applications: The rapid corrosion rate could cause a high hydrogen evolution rate, resulting in hydrogen gas bubble formation shown in the in-vivo tests. Furthermore, chronic inflammation of Mg implant remains an issue.

Zn, as a functional biomaterial with excellent biocompatibility, is developed as a potentially qualified alternative to Mg. Zn has great potential in applications ranging from electrodes for batteries and sensors to micro/nanofillers for conductive paste as the filament or alloying element, while its uses as biocompatible structural materials lack enough attention. Specifically, the low mechanical strength and modulus impede Zn from steadily expanding in arteries and sustaining the vascular contraction as bioresorbable stents (BRS). If the strength of Zn could be improved, BRS would become one of the most promising applications. Additionally, because Zn has a suitable corrosion rate and generates no inflammation in human bodies, this will outplay favorable metals like Mg-based alloy in BRS cases. The corrosion rate of about 10 µm/year for Zn can keep BRS functional for about 12-18 months until the vascular diseases would be most likely cured. Other applications including bioresorbable electronics can be considered, once the toughness is enhanced. Due to the innate metal properties, the electrical conductivity of Zn is much higher than most of the biocompatible semiconductors, making Zn a more suitable option for bioresorbable electronics.

Alloying is a method to strengthen Zn by using a low concentration of a second metallic element, and the mechanisms mainly depend on intermetallic phase precipitation strengthening and solid solution strengthening. However, the corrosion rate will be inevitably increased, and the ductility reduced as a side effect. Furthermore, biocompatibility can be compromised by alloying elements.

Nanoparticles can be an effective method for mechanical strengthening in metallic materials due to the precipitation strengthening (Orowan strengthening), grain refinement (Hall-Petch effect) and load-bearing. Moreover, by using chemically and thermally stable nanoparticles, Zn matrix nanocomposite can achieve the balance among biocompatibility, corrosion rate, and ductility. Therefore, in this example, demonstration is made of the manufacturing method of a strong and ductile Zn—WC nanocomposite as a potential biodegradable material. WC nanoparticles were mainly utilized to enhance the mechanical strength of Zn. Zn—WC nanocomposites obtained an overall optimized combination of mechanical properties, biological properties, and physical properties, serving as an ideal biodegradable material. This example has also investigated the thermal/electrical conductivity of Zn—WC nanocomposite, to validate the viability of being used in bioelectronics.

Method:

Salt-assisted stir casting was performed to mass produce Zn—WC nanocomposite. Potassium aluminum fluoride (KAlF$_4$) was melted at about 700° C. in an about 3 kg-capacity graphite crucible (about 89 mm in height and about 130 mm in inner diameter) within an induction furnace. This molten salt was used for surface oxidation removal. Substantially pure bulk Zn (about 99.9%, RotoMetals) was weighed and added to the crucible while the molten salt was used to cover the metal and protect the metal from oxidation. WC nanoparticles (size from about 50-200 nm) were mixed with fine KAlF$_4$ salt powders at a volume ratio of about 1:20. This example designed the concentration of WC nanoparticles to be about 5 vol. % and about 10 vol. %. The powder mixture was loaded to the crucible slowly while a graphite stirrer was used to mix and incorporate the WC nanoparticles. The mechanical stirrer was set to about 400 rpm and the stirring process lasted for about 1.0 h. The low-density molten salt on the top was poured out before Zn—WC was cast to a disk of about 2-inch diameter and about 0.4-inch in thickness. Hot rolling of Zn—WC nanocomposite was performed at about 200° C. with a thickness reduction ratio of about 1:14. Thin plates of about 0.03-inch thickness were used for microstructure characterization by scanning electron microscopy (SEM), element detection by X-ray diffraction (XRD) and inductively coupled plasma-mass spectrometry (ICP-MS), and electrical/thermal conductivity measurement. Wire-electrical discharge machining (wire-EDM) was used to cut samples to dog-bone shape for the tensile test (tensile test standard shown in Table 5).

TABLE 5

Tensile test standard

| | |
|---|---|
| Standard | ASTM E8/E8M |
| Shape | Rectangular subsize specimen |
| Width | 6 mm |
| Gauge length | 25 mm |
| Strain rate | 0.5 mm/min |

Characterization:

In this example, due to the constraint of nanoparticle incorporation efficiency, Zn matrix nanocomposite samples obtained lower nanoparticle concentration than designed. The WC concentrations have been determined by the characterization of ICP-MS. Two representative samples (Zn-2.6 vol. % WC (Zn-2.6WC) and Zn-4.4 vol. % WC (Zn-4.4WC)) were characterized and compared to the pure Zn sample processed under the same condition.

WC Concentration

ICP-MS is a type of mass spectrometry for detecting a metallic element concentration. Zn—WC nanocomposites were ground to small pieces for ICP-MS testing, and the results were converted to WC concentrations in volume percentage, shown in Table 6. Aqua regia was used as a suitable digestion method for extracting trace element W to determine the nanoparticle concentration. Compared with energy dispersive X-ray spectroscopy (EDX), this method obtains a more accurate nanoparticle concentration disregarding the dispersion inhomogeneity in local areas.

TABLE 6

ICP-MS result of Zn and Zn-WC nanocomposite samples

| | Concentration [mg/g] | | |
|---|---|---|---|
| | Zn | W | WC (vol. %) |
| Zn | 769.2 ± 4.5 | 1.2 ± 0.0 | 0.0% |
| Zn-2.6 WC | 761.4 ± 1.7 | 42.0 ± 1.5 | 2.6% |
| Zn-4.4 WC | 802.7 ± 0.2 | 75.8 ± 2.3 | 4.4% |

Chemical Composition

Figure 11:
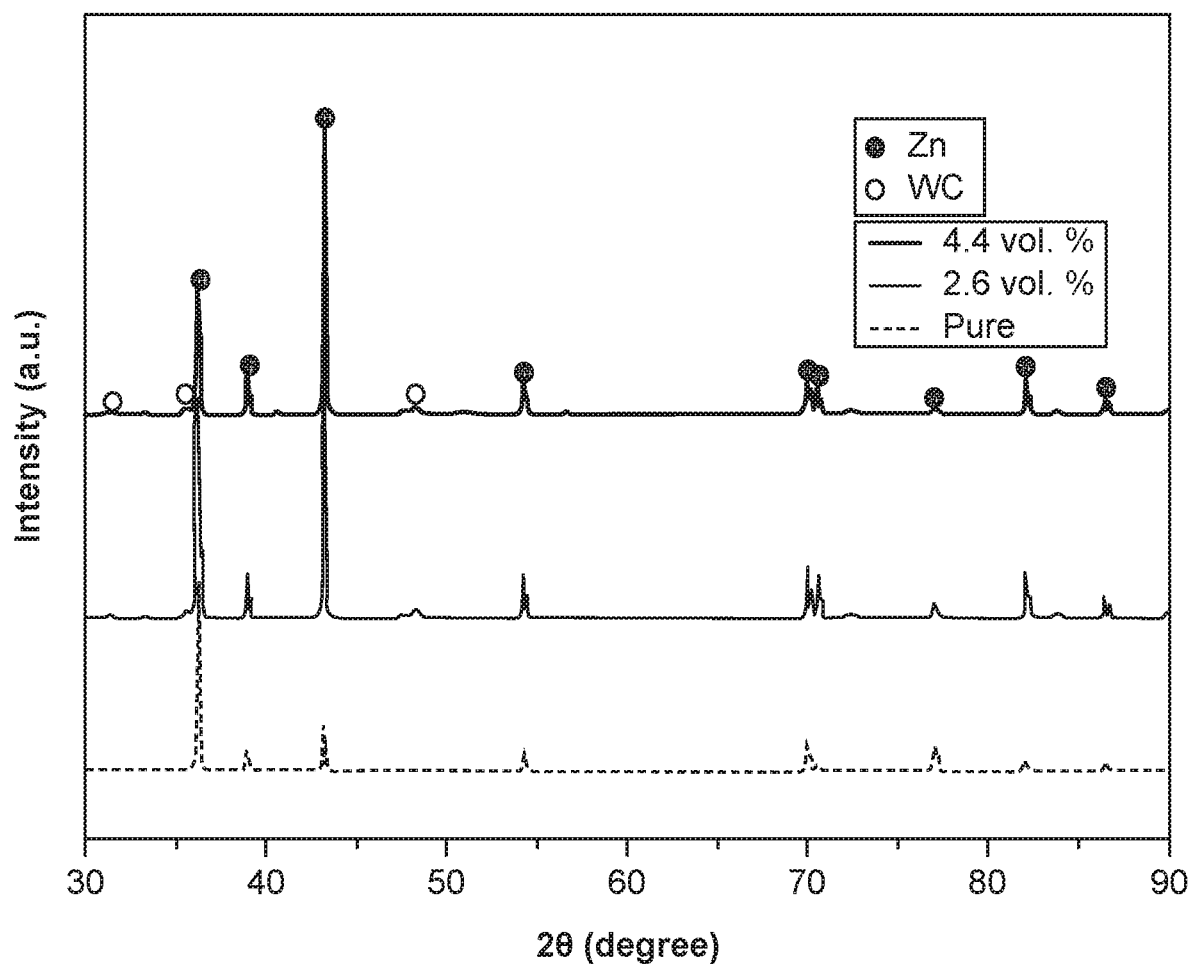
FIG. 11. Diffraction pattern of Zn and Zn—WC nanocomposite samples.

XRD was performed on the nanocomposite samples and the reference sample to semi-quantitatively characterize the chemical composition on the surfaces of the materials, as shown in FIG. 11. The diffraction peaks of WC could be observed on the XRD pattern for Zn-2.6WC and Zn-4.4WC samples, where the diffraction angles are from about 30 to about 90 degrees. Furthermore, no unwanted by-products were observed, indicating that WC nanoparticle did not react with Zn during the process.

Microstructures

Figure 13C:
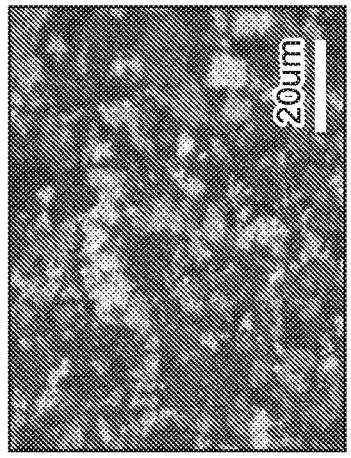
FIG. 13. Optical images of hot-rolled sample for grain size measurement, including (a) Zn, (b) Zn-2.6WC and (c) Zn-4.4WC; (d) Vickers microhardness and grain size of Zn and Zn—WC nanocomposite samples; and (e) tensile test result of Zn and Zn—WC nanocomposite samples.
Figure 13B:
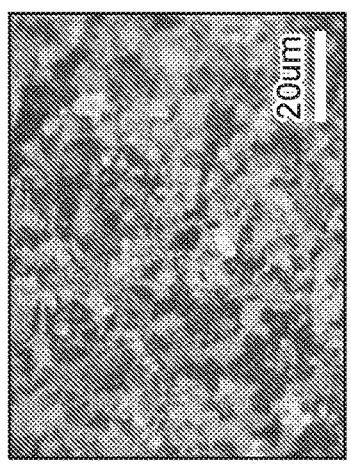
Figure 13A:
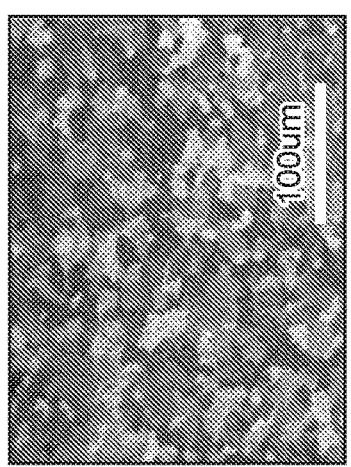

SEM in backscattering mode was performed on the nanocomposite samples to investigate the nanoparticle dispersion, as shown in FIG. 12. The bright phase refers to the WC nanoparticles, while the darker phase represents the Zn matrix. Compared with Zn-2.6WC (FIGS. 2(a) and 2(b)), Zn-4.4WC (FIGS. 2(c) and 2(d)) exhibited a better homogeneity. The pseudo-microclusters of WC nanoparticles observed in Zn-2.6WC indicated certain constraints in nanoparticle dispersion for the low concentrated nanocomposite since the nanoparticle size is overly large. This will be illustrated further in the below discussion. To further understand the crystal structure and the potential Hall-Petch effect, optical images are shown in FIG. 13a-c, where hot rolled samples were etched (etchant: about 20% $CrO_3$ and about 5% $Na_2SO_4$ in distilled water).

Hardness and Mechanical Properties from Tensile Test

Figure 13D:
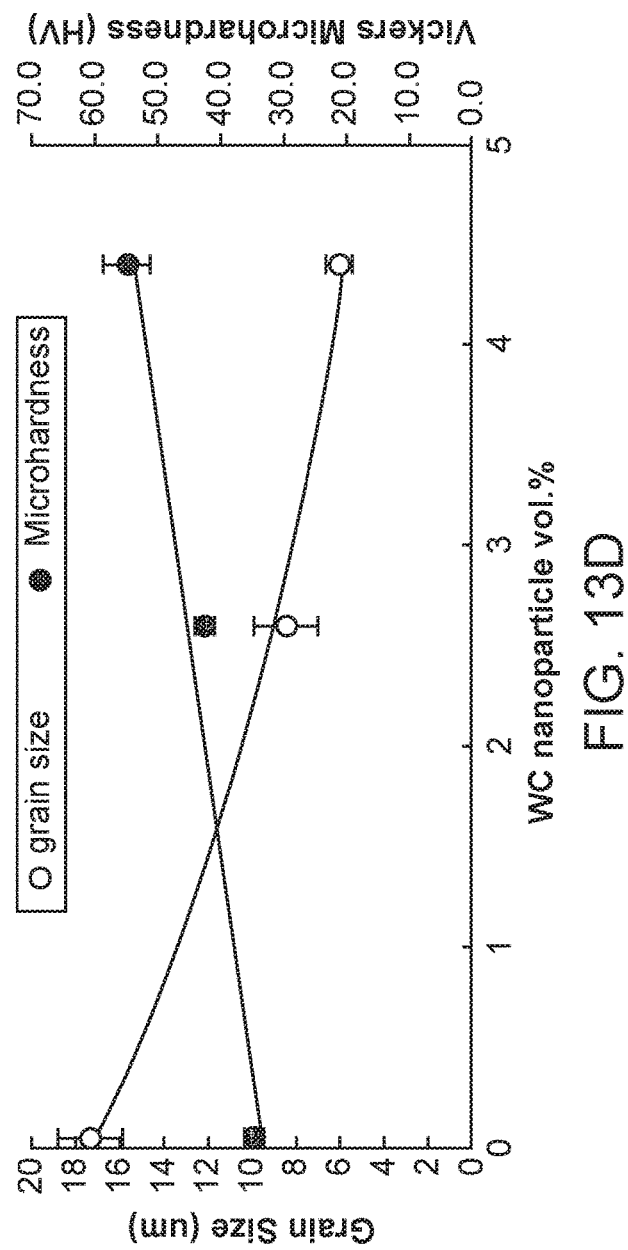
Figure 13E:
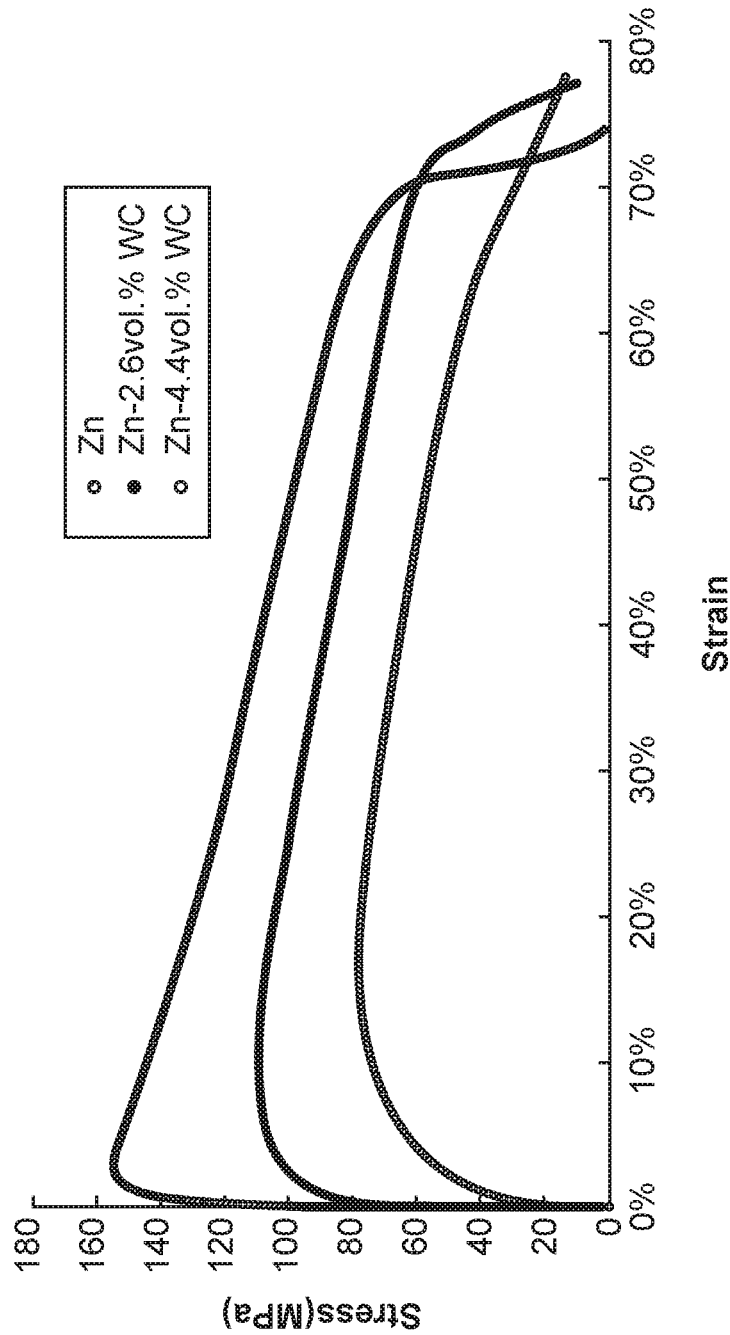

Vickers microhardness was measured, using about 300 gf and about 10 s dwelling time. FIG. 13(d) shows that Vickers microhardness of the Zn-4.4% WC nanocomposite has increased by more than about 43% from about 34.9 HV to about 55.0 HV, while the grain size has reduced from about 17.4 μm to 6.1 μm. The tensile test was performed on Instron 5966 Dual Column Tabletop Testing systems, as shown in FIG. 13(e). Zn-4.4WC has improved the ultimate tensile strength (UTS) by about 98% from about 78.2 MPa to about 155.2 MPa, while the ductility has modestly decreased from about 78% to about 73%. This example indicated that homogeneous nanoparticle dispersion could be the factor to avoid significant ductility reduction.

Electrical Conductivity and Thermal Conductivity

Figure 14A:
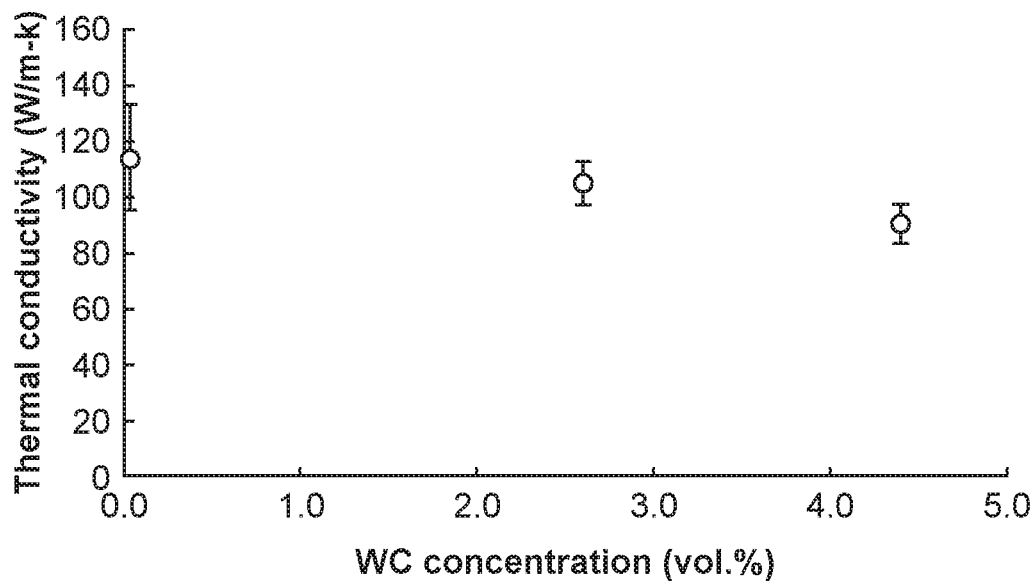
FIG. 14. (a) Thermal conductivity of Zn—WC with respect to the WC nanoparticle concentration; and (b) electrical conductivity of Zn—WC with respect to the WC nanoparticle concentration.
Figure 14B:
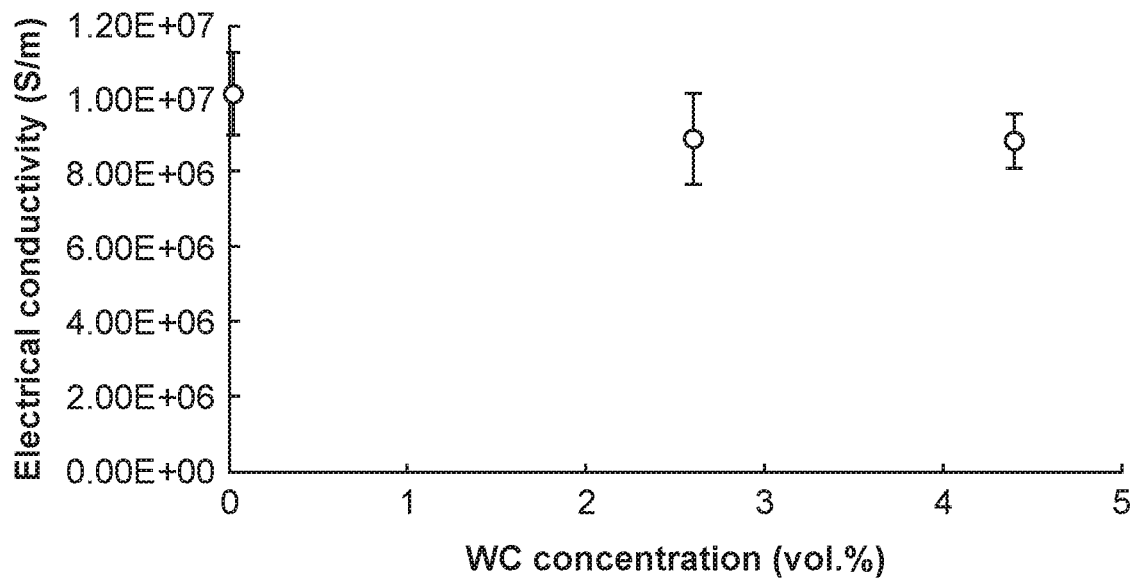

The sheet resistance of the nanocomposite samples was measured by ResMap four-point probe, as shown in FIG. 14(b), and thermal conductivity was calculated through measurements of heat capacity by differential scanning calorimetry (DSC) and thermal diffusivity by laser flash analysis, as shown in FIG. 14(a). No significant conductivity reduction was observed through the measurements. The electrical conductivity of Zn-4.4WC has reduced from about $10.2 \times 10^6$ S/m to about $8.9 \times 10^6$ S/m, and the thermal conductivity has reduced from about 114.6 W/m-K to about 91.0 W/m-K. Both thermal/electrical conductivity did not significantly reduce after nanoparticle incorporation. All related mechanical and physical results are presented in Table 7.

TABLE 7

Mechanical properties from the tensile test and other physical properties

| | UTS (MPa) | Yield strength (MPa) | Elongation to fail |
|---|---|---|---|
| Zn | 78.2 | 28.2 | 77.3% |
| Zn-2.6WC | 109.2 | 68.9 | 77.0% |
| Zn-4.4WC | 155.2 | 125.0 | 73.8% |

| | Grain size (μm) | Vickers microhardness (HV) | Electrical conductivity ($\times 10^6$ S/m) | Thermal conductivity (W/m-K) |
|---|---|---|---|---|
| Zn | 17.4 ± 1.5 | 34.9 ± 1.2 | 10.2 ± 1.1 | 114.6 ± 19.0 |
| Zn-2.6WC | 8.5 ± 1.5 | 42.7 ± 1.5 | 8.9 ± 1.2 | 105.2 ± 7.8 |
| Zn-4.4WC | 6.1 ± 0.6 | 55.0 ± 3.6 | 8.9 ± 0.7 | 91.0 ± 7.2 |

Discussion:

The good wettability between WC and molten Zn provides a self-stabilization mechanism by a force balance between particle-particle van der Waals force and particle-molten metal surface tension. The self-stabilization mechanism results in nanoparticle self-dispersion in molten Zn. The phenomenon of pseudo-microclusters in Zn-2.6WC results from the strong particle-particle attraction.

Zn-4.4WC, on the other hand, obtained a better nanoparticle dispersion due to the higher concentration. The observed non-uniform dispersion could be solved by using nanoparticles of smaller size.

The major strengthening mechanisms of the Zn—WC nanocomposite are grain refinement and precipitation hardening. The grain size of Zn is one of the determinant factors of mechanical strength, and the casted Zn with a larger grain size of about 100 µm has about 30 MPa in UTS. Nanoparticle-induced grain refinement results from the impedance of grain growth during the solidification. Finer crystalline size (with a grain size of about 6.1 µm) provides grain-boundary strengthening, also referred as Hall-Petch strengthening, and increases the impedance of dislocation propagation. Another contributing reason is the precipitation strengthening effect directly from WC nanoparticles. The presence of nanoparticles could counteract against the movement of dislocation so that higher energy would be involved to shear through/around the nanoparticles by Orowan mechanism. Other strengthening mechanisms including load-transfer effect and thermal expansion coefficient/elastic modulus mismatch may apply, but aren't dominant in this case.

Other efforts on nanoparticle-reinforced metal matrix nanocomposite show that this approach might severely sacrifice ductility because of nanoparticle agglomeration, sintering, impurities and voids. Such defects could initiate the stress propagation during the tensile test and finally cause ductility reduction. In this example, salt-assisted stir casting can sufficiently avoid oxidation of the Zn matrix, contamination, nanoparticle agglomeration and sintering, while a good nanoparticle dispersion by self-stabilization mechanism can be achieved. Moreover, the hot extrusion process could further enhance the dispersion homogeneity, by which nanoparticles can migrate through the dispersion direction to ensure the ductility.

The manufacturing of Zn—WC provides opportunities for applications in bioresorbable electronics and BRS. WC nanoparticles have introduced significant improvement on the toughness of Zn, so that bioresorbable devices made of Zn—WC can survive impacts from human bodies, such as muscle movement, heart beating and vessel contraction. High electrical conductivity provides a better signal-to-noise ratio in sensing and high thermal conductivity provides faster heat release for electronics. With an optimized combination of good toughness and electrical/thermal conductivity, Zn—WC nanocomposite can be suitable for applications such as electrodes and interconnects in bioresorbable electronics. Zn—WC evaluated in this example has shown a good combination of mechanical and biological properties, including biocompatibility, non-toxicity of both Zn and WC, mechanical ductility (elongation to failure >about 70%), mechanical strength (UTS of about 158 MPa) and microhardness (about 55 HV). Zn—WC can outplay Mg-based stent, whose corrosion rate is too rapid, and biodegradable polymeric stent, whose mechanical strength is generally too small.

Conclusion:

This example presents an improved biodegradable material of Zn—WC nanocomposite. A combination of good mechanical properties and physical properties has been achieved with a modest amount of about 4.4 vol. % WC nanoparticle in Zn matrix. With the significantly enhanced mechanical strength, the ultimate tensile strain, thermal conductivity and electrical conductivity all remain at a relatively high level with negligible side effect by homogeneously dispersed WC nanoparticles. This example has demonstrated that Zn—WC nanocomposites can be a promising biodegradable material for applications of BRS and bioresorbable electronics.

Further optimization of nanoparticle size and nanoparticle concentration can be performed to control the mechanical properties of the nanocomposite. Furthermore, due to the low recrystallization temperature of Zn, self-annealing may damage the mechanical properties along lifetime. Further consideration can be made on how nanoparticles interact with the process of recrystallization and help maintain long-term mechanical stability.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "nanostructure" refers to an object that has at least one dimension in a range of about 1 nm to about 1000 nm. A nanostructure can have any of a wide variety of shapes, and can be formed of a wide variety of materials. Examples of nano structures include nanofibers, nanoplatelets, and nanoparticles.

As used herein, the term "nanoparticle" refers to a nanostructure that is generally or substantially spherical or spheroidal. Typically, each dimension of a nanoparticle is in a range of about 1 nm to about 1000 nm, and the nanoparticle has an aspect ratio of about 5 or less, such as about 3 or less, about 2 or less, or about 1.

As used herein, the term "nanofiber" refers to an elongated nanostructure. Typically, a nanofiber has a lateral dimension (e.g., a width) in a range of about 1 nm to about 1000 nm, a longitudinal dimension (e.g., a length) in a range of about 1 nm to about 1000 nm or greater than about 1000 nm, and an aspect ratio that is greater than about 5, such as about 10 or greater.

As used herein, the term "nanoplatelet" refers to a planar-like, nanostructure.

As used herein, the term "microstructure" refers to an object that has at least one dimension in a range of about 1 µm to about 1000 µm. A microstructure can have any of a wide variety of shapes, and can be formed of a wide variety of materials. Examples of microstructures include microfibers, microplatelets, and microparticles.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A biomedical device comprising:
a Zinc (Zn)-based material having a degradation rate of about 10 µm/year to about 100 µm/year, the Zn-based material including a matrix including Zn, and nanostructures dispersed in the matrix,
wherein the nanostructures include a ceramic, and
wherein the ceramic is a transition metal-containing ceramic.

2. The biomedical device of claim 1, wherein the transition metal-containing ceramic is selected from transition metal carbides and transition metal borides.

3. The biomedical device of claim 1, wherein the transition metal-containing ceramic is tungsten carbide (WC).

4. A biomedical device comprising:
a Zinc (Zn)-based material having a degradation rate of about 10 µm/year to about 100 µm/year, the Zn-based material including a matrix including Zn, and nanostructures dispersed in the matrix,
wherein the nanostructures have an average dimension in a range of 100 nm to 1000 nm, and
wherein the nanostructures include tungsten carbide (WC), and
wherein the nanostructures are dispersed in the matrix at a volume fraction of 2.5% or greater of the Zn-based material.

5. The biomedical device of claim 4, wherein the Zn-based material comprises a tube-shaped hollow structure having a solid exterior wall comprised of the Zn-based material and a hollow interior.

6. The biomedical device of claim 5, wherein the solid exterior wall of the hollow structure has a thickness in a range of 500 nm to 5 mm.

7. The biomedical device of claim 1, wherein the transition metal-containing ceramic is titanium carbide (TiC).

* * * * *